United States Patent [19]

Togino

[11] Patent Number: 5,659,430

[45] Date of Patent: *Aug. 19, 1997

[54] VISUAL DISPLAY APPARATUS

[75] Inventor: Takayoshi Togino, Koganei, Japan

[73] Assignee: Olympus Optical Co., Ltd., Tokyo, Japan

[*] Notice: The term of this patent shall not extend beyond the expiration date of Pat. No. 5,517,366.

[21] Appl. No.: 359,659

[22] Filed: Dec. 20, 1994

[30] Foreign Application Priority Data

Dec. 21, 1993 [JP] Japan .................................. 5-322124
Dec. 21, 1993 [JP] Japan .................................. 5-322125

[51] Int. Cl.$^6$ .................................................. G02B 17/00
[52] U.S. Cl. ...................................... 359/731; 359/630
[58] Field of Search ................................ 359/629, 630, 359/631, 633, 728, 733, 726, 731

[56] References Cited

U.S. PATENT DOCUMENTS

| | | |
|---|---|---|
| Re. 27,356 | 5/1972 | La Russa . |
| 2,697,182 | 12/1954 | Sheldon .................................. 359/728 |
| 2,749,801 | 11/1956 | Clotar .................................. 359/728 |
| 2,803,996 | 8/1957 | Bouwers .................................. 359/728 |
| 3,443,858 | 5/1969 | La Russa . |
| 3,940,203 | 2/1976 | La Russa . |
| 4,007,979 | 2/1977 | Coblitz . |
| 4,163,542 | 8/1979 | La Russa . |
| 4,195,911 | 4/1980 | Bougon et al. .................................. 359/629 |
| 4,322,135 | 3/1982 | Freeman . |
| 4,331,390 | 5/1982 | Shafer .................................. 359/731 |
| 5,071,239 | 12/1991 | Hoffman et al. .................................. 359/728 |
| 5,124,821 | 6/1992 | Antier et al. . |
| 5,144,482 | 9/1992 | Gould . |
| 5,402,269 | 3/1995 | Oono et al. .................................. 359/633 |
| 5,452,126 | 9/1995 | Johnson .................................. 359/726 |
| 5,485,305 | 1/1996 | Johnson .................................. 359/731 |
| 5,517,366 | 5/1996 | Togino . |

FOREIGN PATENT DOCUMENTS

| | | |
|---|---|---|
| 408344 | 1/1991 | European Pat. Off. . |
| 067037 | 11/1957 | France . |
| 1257192 | 1/1961 | France . |
| 3-101709 | 4/1991 | Japan . |

OTHER PUBLICATIONS

Journ. Soc. Mot. Pict. Engineers, vol. 44, No. 6 1945 pp. 444–445.
King, "New Light on the Telescope", The Optician, CXXIV, No. 3223 pp. 645, 646 (1953).
Japanese Patent Abstract, 2-178691, Jun.–1990.
Yano: "Psychological Effects of Visual Angle for Stereoscopic Images", The Journal of the Institute of Television Engineers of Japan, vol. 45, No. 12, pp. 1589–1596 (1991) pp. 1589–1596.

Primary Examiner—Scott J. Sugarman
Attorney, Agent, or Firm—Cushman, Darby & Cushman IP Group of Pillsbury Madison & Sutro LLP

[57] ABSTRACT

A compact and lightweight visual display apparatus having high resolution and a large exit pupil diameter, which enables observation of an image that is flat and clear as far as the edges of the visual field at a wide viewing angle of 30° or more using a planar two-dimensional image display device. The apparatus uses a concentric optical system which provides a flat image surface (4) as an ocular optical system. The concentric optical system has at least two semitransparent reflecting surfaces (2 and 3) which have respective centers of curvature disposed in the vicinity of a pupil (1) and which have respective concave surfaces directed toward the pupil. The semitransparent reflecting surfaces are disposed so that each semitransparent reflecting surface transmits light rays at least once and reflects them at least once.

30 Claims, 19 Drawing Sheets

FIG. 15(a)(1)
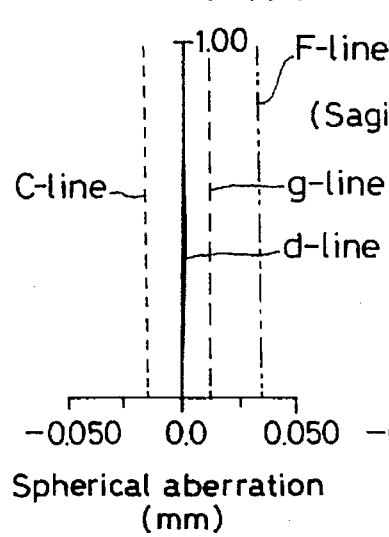
Spherical aberration (mm)
FIG. 15(a)(2)
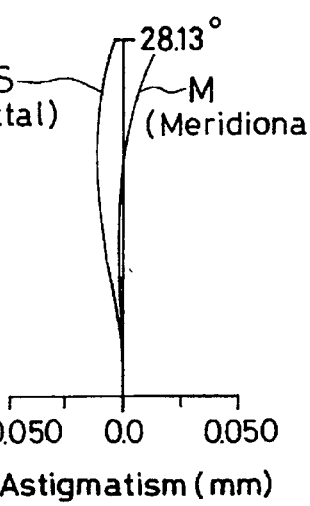
Astigmatism (mm)
FIG. 15(a)(3)
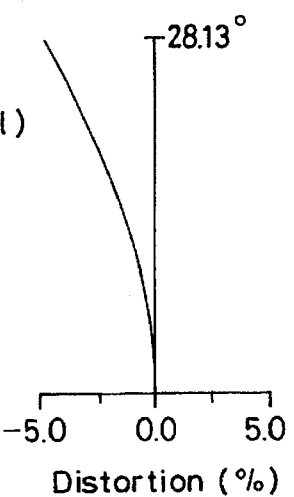
Distortion (%)
FIG. 15(b)(1)
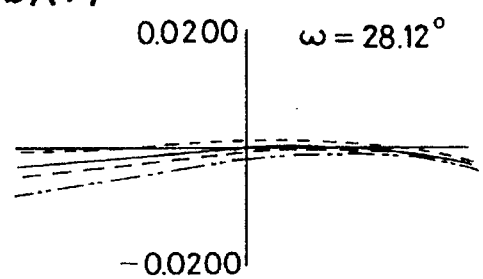
FIG. 15(b)(2)
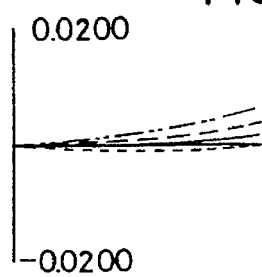
FIG. 15(b)(3)
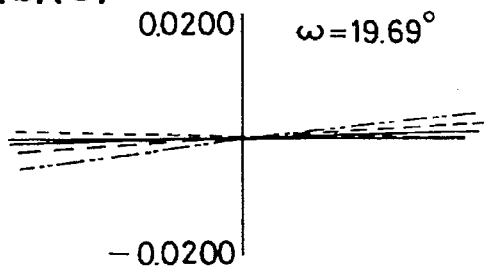
FIG. 15(b)(4)
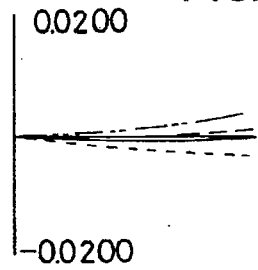
FIG. 15(b)(5)
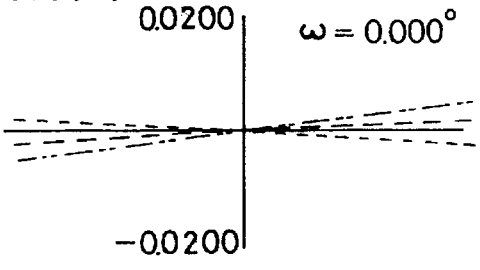
FIG. 15(b)(6)
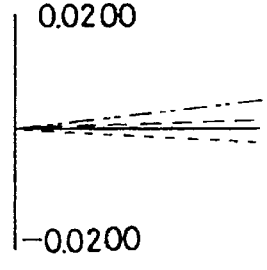
(Meridional direction)   (Sagittal direction)
Lateral aberration (mm)

FIG. 16(a)(1)
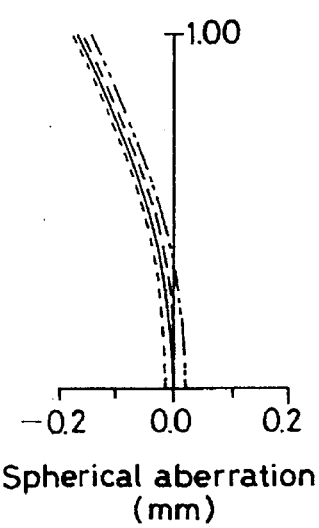
Spherical aberration (mm)
FIG. 16(a)(2)
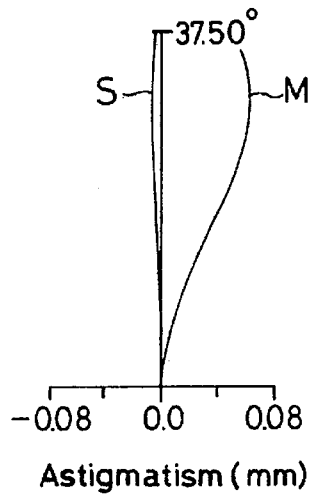
Astigmatism (mm)
FIG. 16(a)(3)
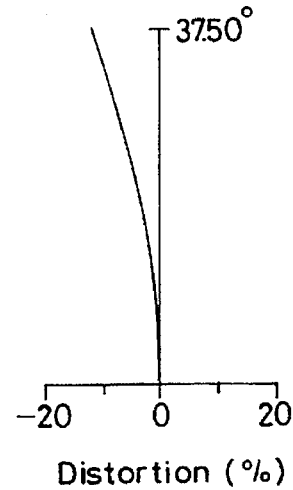
Distortion (%)
FIG. 16(b)(1)
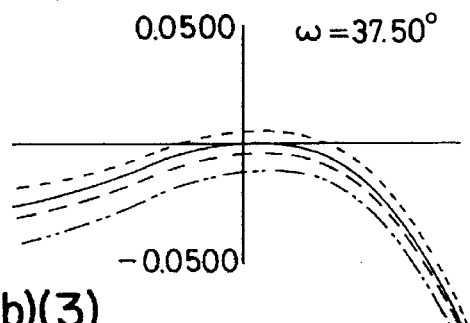
FIG. 16(b)(2)
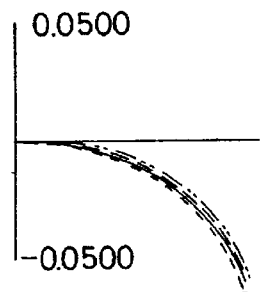
FIG. 16(b)(3)
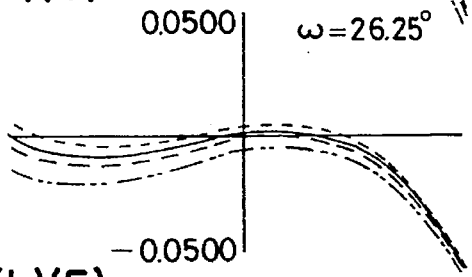
FIG. 16(b)(4)
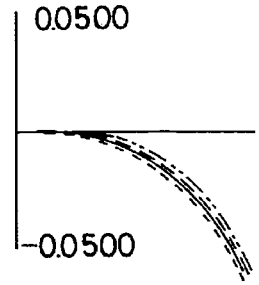
FIG. 16(b)(5)
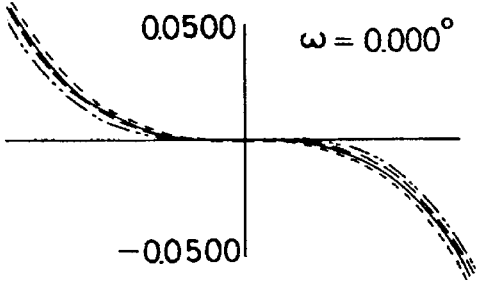
FIG. 16(b)(6)
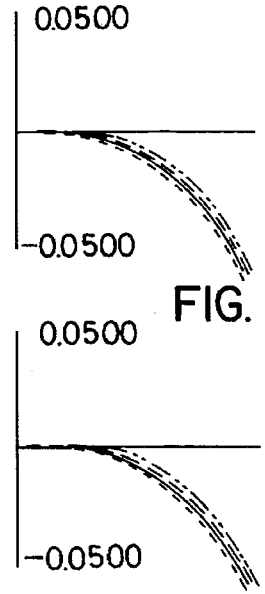
(Meridional direction)    (Sagittal direction)
Lateral aberration (mm)

FIG. 17(a)(1)
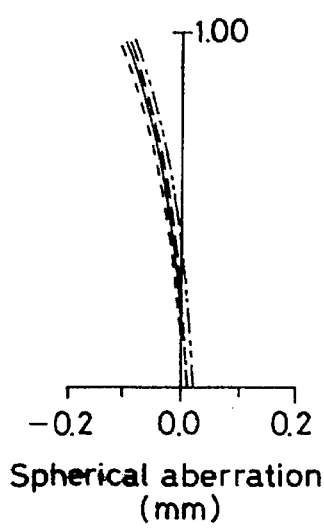
Spherical aberration (mm)
FIG. 17(a)(2)
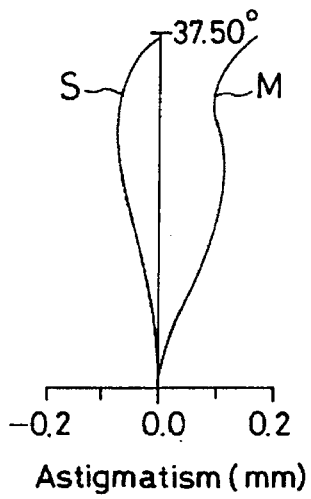
Astigmatism (mm)
FIG. 17(a)(3)
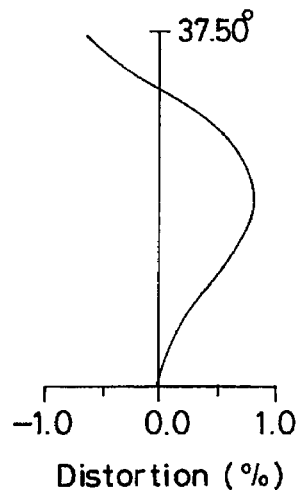
Distortion (%)
FIG. 17(b)(1)
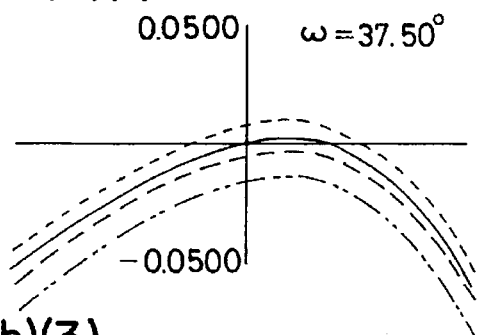
FIG. 17(b)(2)
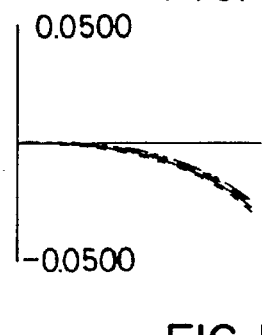
FIG. 17(b)(3)
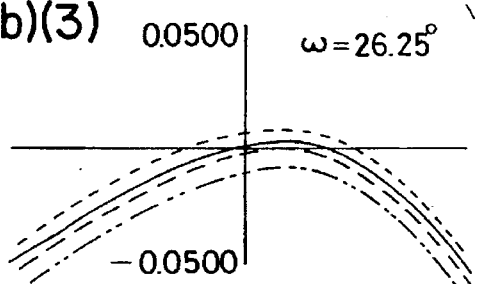
FIG. 17(b)(4)
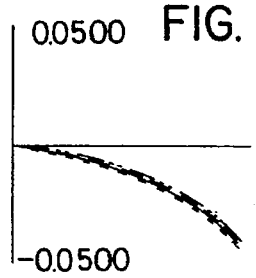
FIG. 17(b)(5)
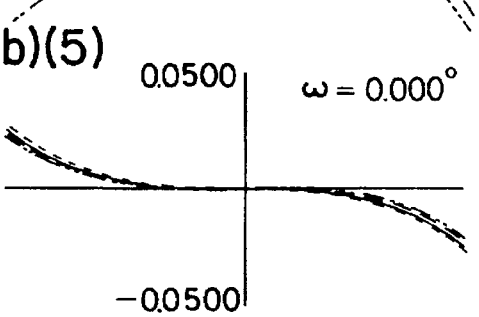
FIG. 17(b)(6)
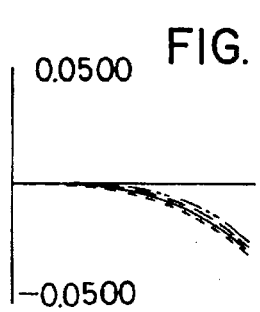
(Meridional direction)　　(Sagittal direction)
Lateral aberration (mm)

FIG. 18(a)(1)
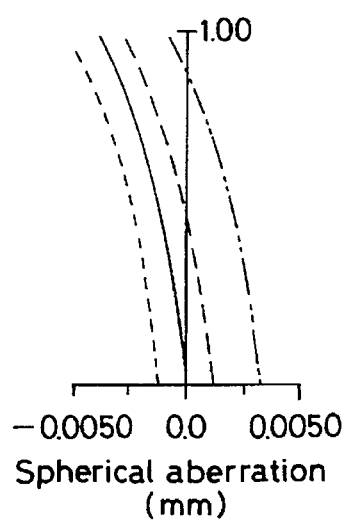
Spherical aberration (mm)
FIG. 18(a)(2)
FIG. 18(a)(3)
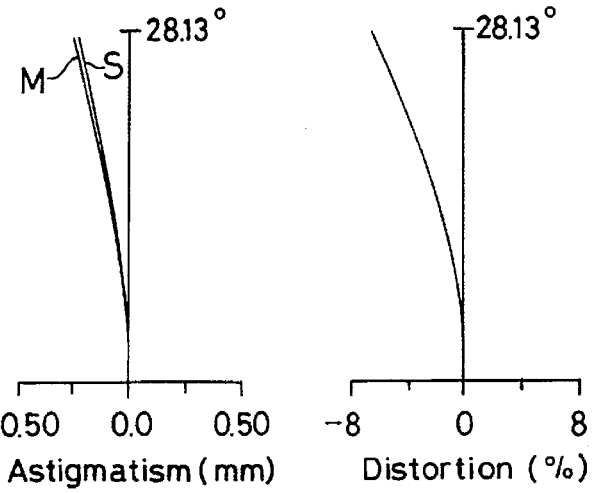
Astigmatism (mm)    Distortion (%)
FIG. 18(b)(1)
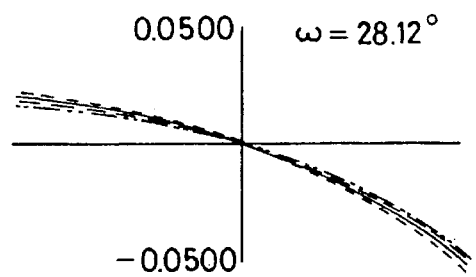
FIG. 18(b)(2)
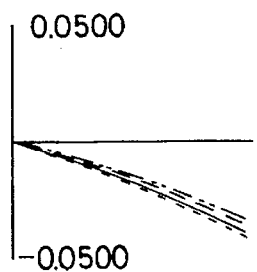
FIG. 18(b)(3)
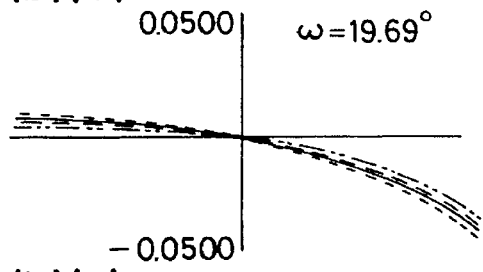
FIG. 18(b)(4)
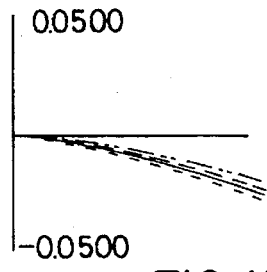
FIG. 18(b)(5)
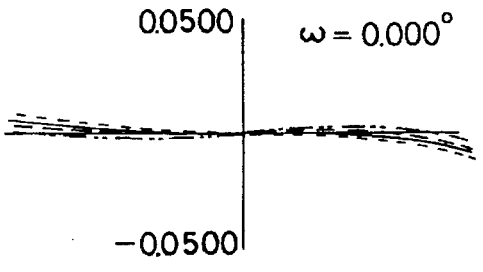
FIG. 18(b)(6)
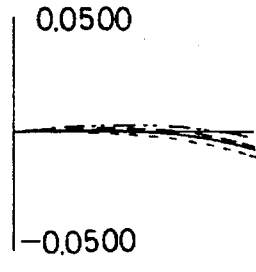
(Meridional direction)    (Sagittal direction)
Lateral aberration (mm)

FIG. 19(a)(1)
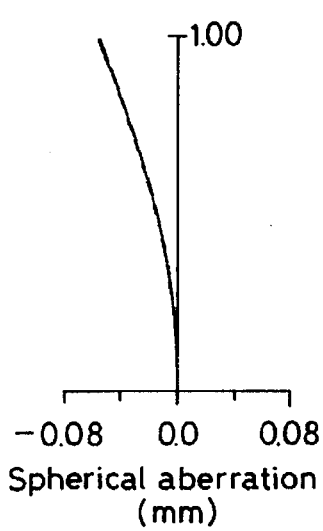
Spherical aberration (mm)
FIG. 19(a)(2)
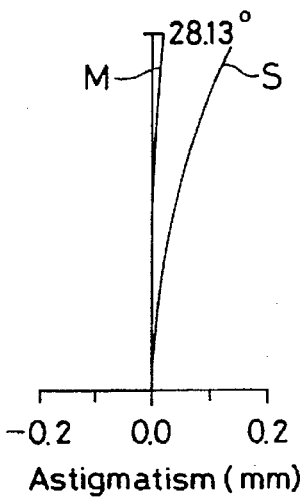
Astigmatism (mm)
FIG. 19(a)(3)
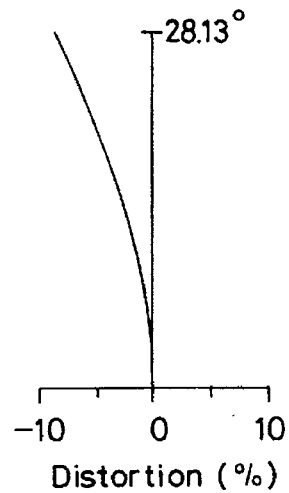
Distortion (%)
FIG. 19(b)(1)
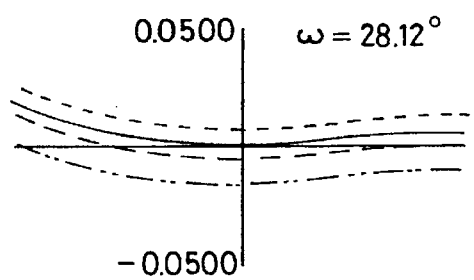
FIG. 19(b)(2)
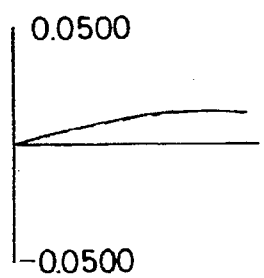
FIG. 19(b)(3)
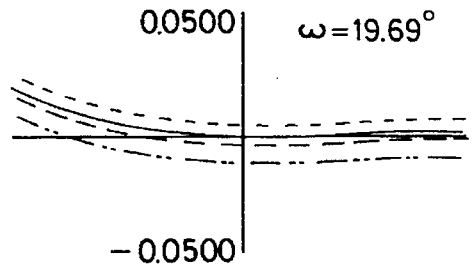
FIG. 19(b)(4)
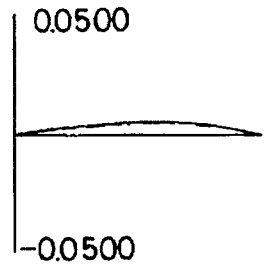
FIG. 19(b)(5)
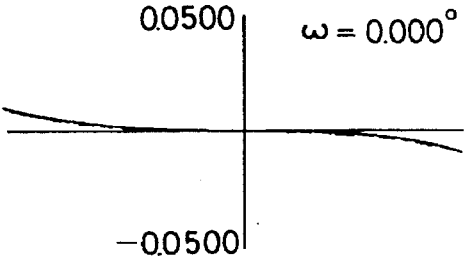
FIG. 19(b)(6)
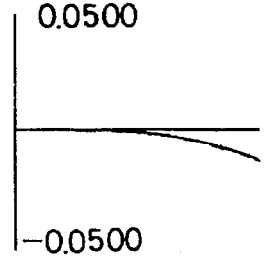
(Meridional direction)     (Sagittal direction)
Lateral aberration (mm)

FIG. 20(a)(1)
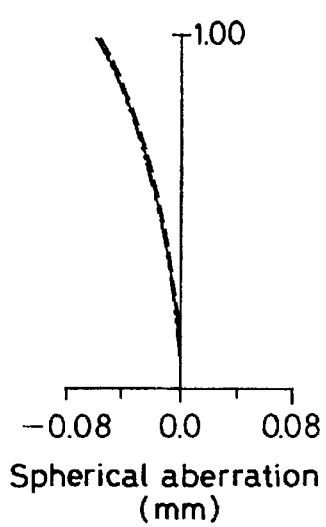
Spherical aberration (mm)
FIG. 20(a)(2)
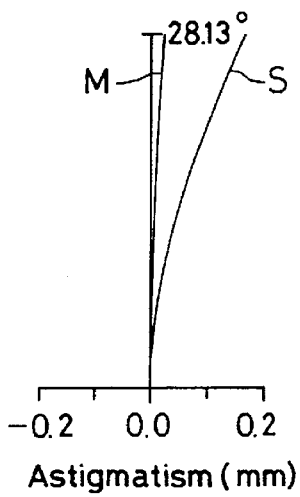
Astigmatism (mm)
FIG. 20(a)(3)
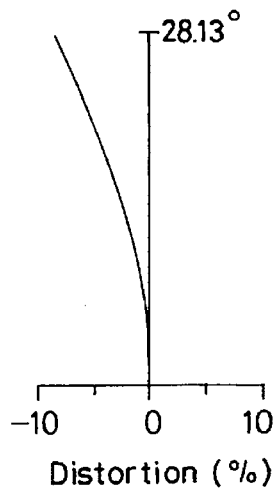
Distortion (%)
FIG. 20(b)(1)
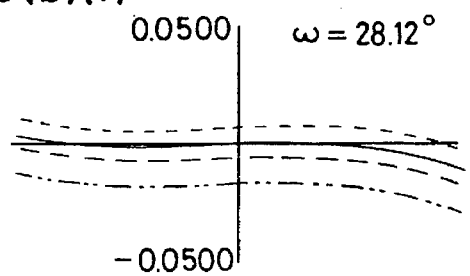
FIG. 20(b)(2)
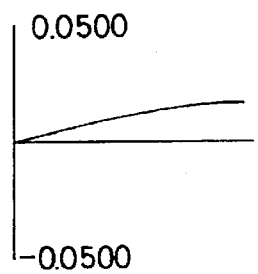
FIG. 20(b)(3)
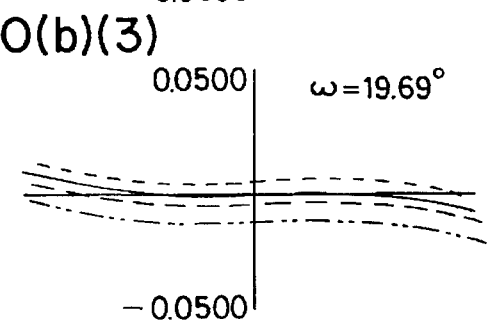
FIG. 20(b)(4)
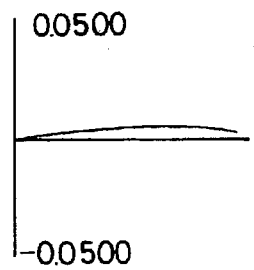
FIG. 20(b)(5)
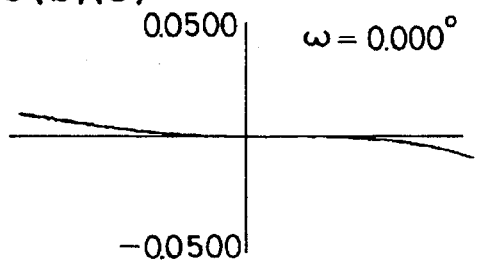
FIG. 20(b)(6)
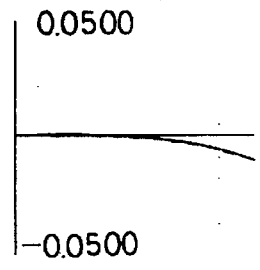
(Meridional direction)     (Sagittal direction)
Lateral aberration (mm)

FIG. 21(a)(1)  FIG. 21(a)(2)  FIG. 21(a)(3)
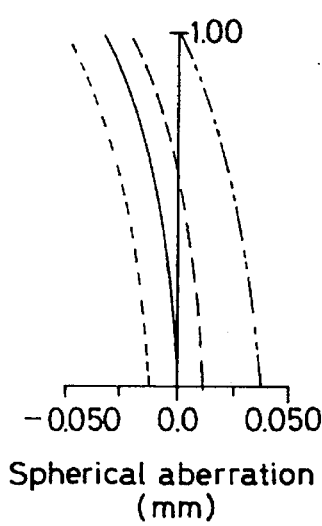
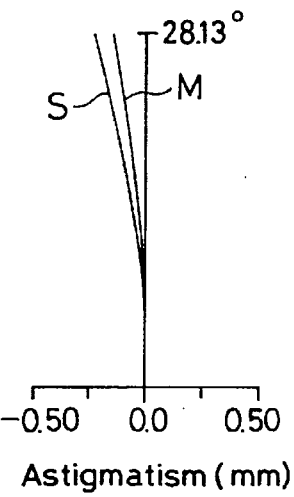
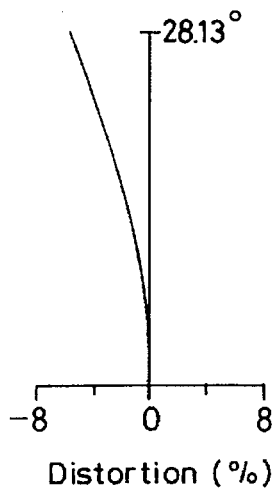
Spherical aberration (mm)    Astigmatism (mm)    Distortion (%)
FIG. 21(b)(1)  FIG. 21(b)(2)
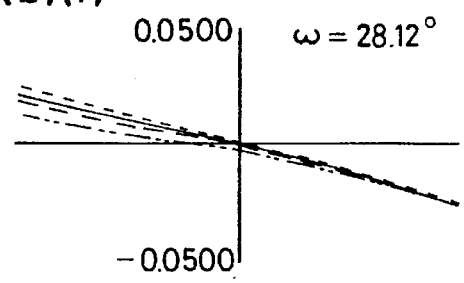
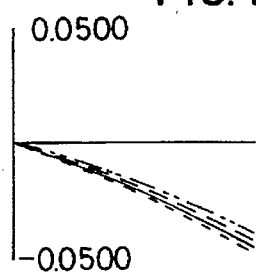
FIG. 21(b)(3)  FIG. 21(b)(4)
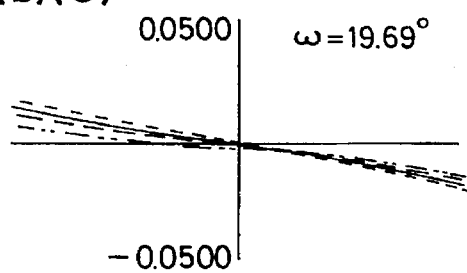
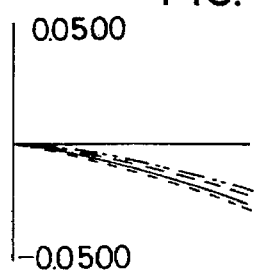
FIG. 21(b)(5)  FIG. 21(b)(6)
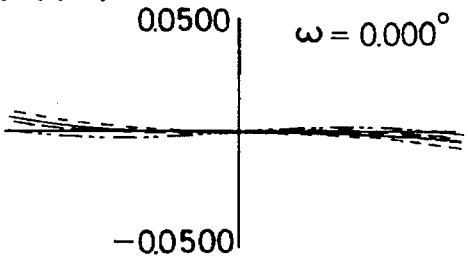
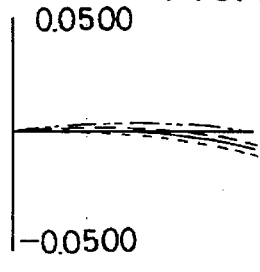
(Meridional direction)    (Sagittal direction)
Lateral aberration (mm)

FIG. 22(a)(1)
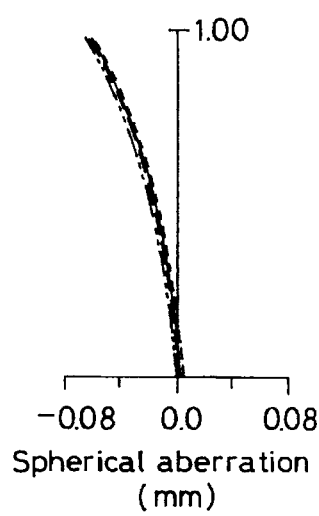
Spherical aberration (mm)
FIG. 22(a)(2)
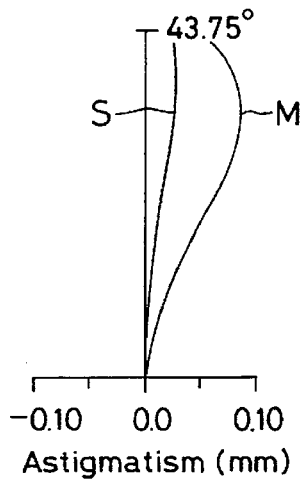
Astigmatism (mm)
FIG. 22(a)(3)
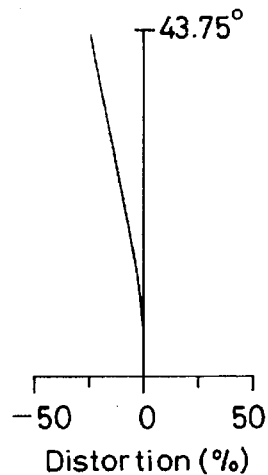
Distortion (%)
FIG. 22(b)(1)
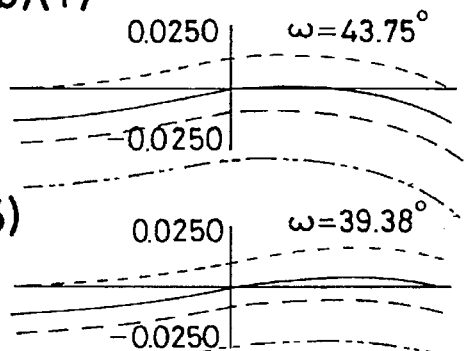
FIG. 22(b)(2)
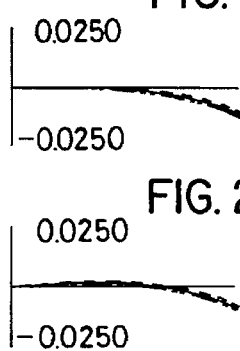
FIG. 22(b)(3)
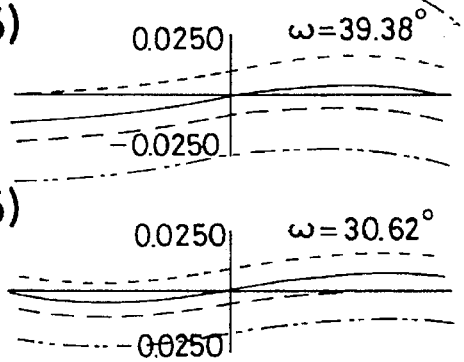
FIG. 22(b)(4)
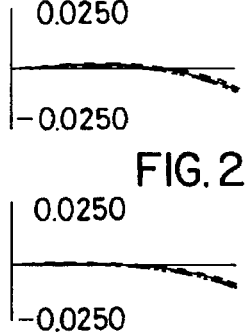
FIG. 22(b)(5)
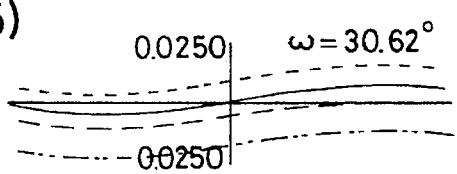
FIG. 22(b)(6)
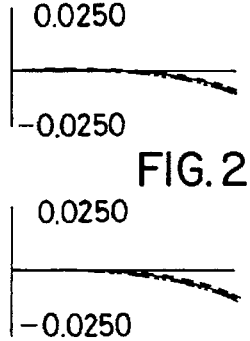
FIG. 22(b)(7)
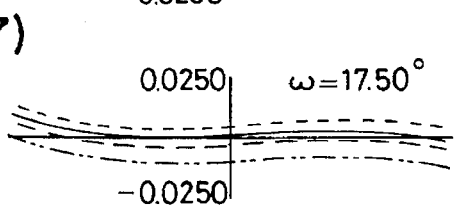
FIG. 22(b)(8)
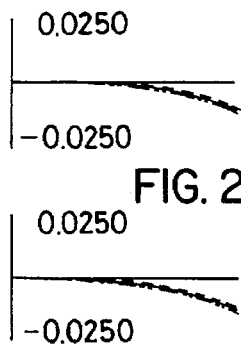
FIG. 22(b)(9)
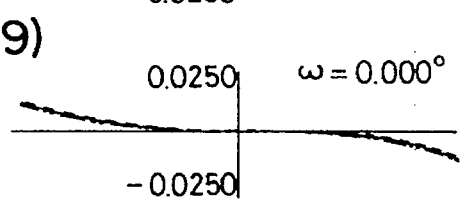
FIG. 22(b)(10)
(Meridional direction)  (Sagittal direction)
Lateral aberration (mm)

FIG.23(a)(1) 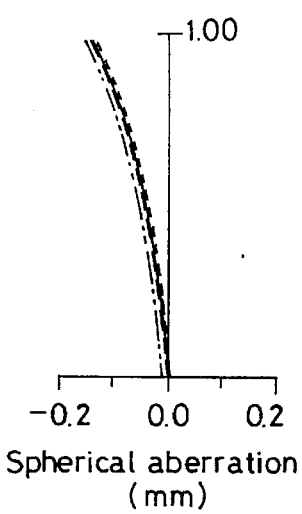
Spherical aberration (mm)
FIG.23(a)(2) 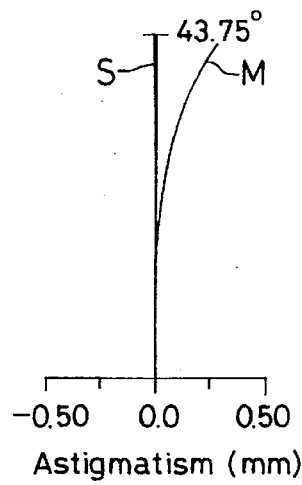
Astigmatism (mm)
FIG.23(a)(3) 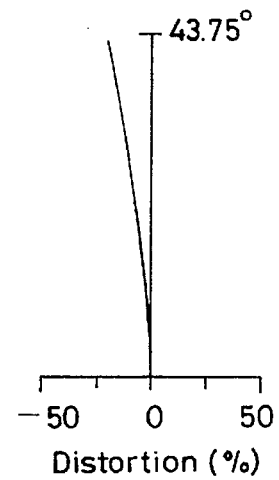
Distortion (%)
FIG.23(b)(1) 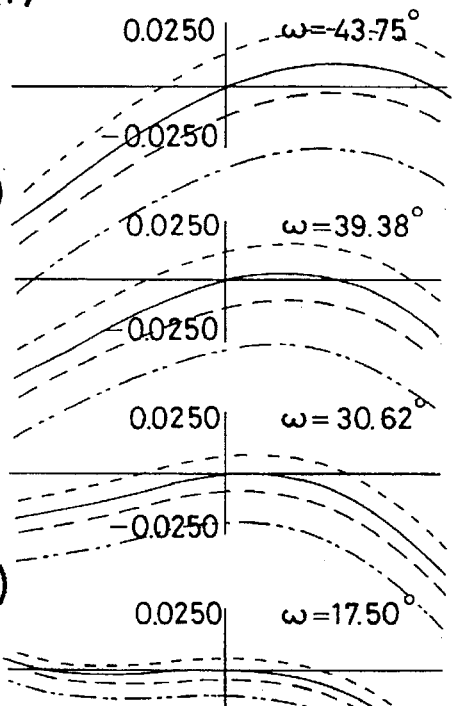
FIG.23(b)(3)
FIG.23(b)(5)
FIG.23(b)(7)
FIG.23(b)(9)
(Meridional direction)
FIG.23(b)(2) 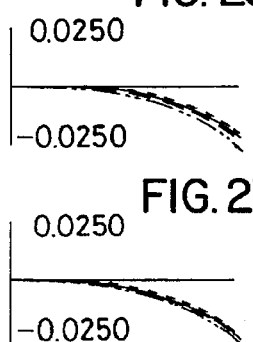
FIG.23(b)(4) 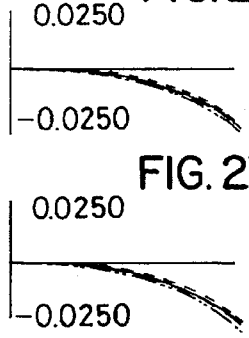
FIG.23(b)(6) 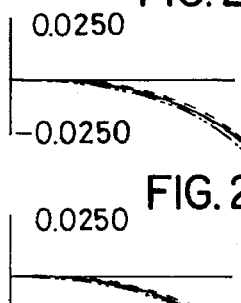
FIG.23(b)(8)
FIG.23(b)(10) 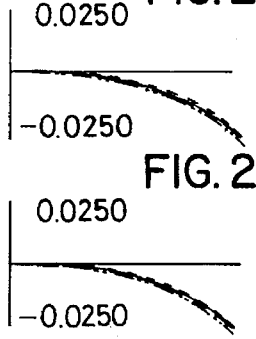
(Sagittal direction)
Lateral aberration (mm)

VISUAL DISPLAY APPARATUS

BACKGROUND OF THE INVENTION

1. Field of the Invention

The present invention relates to a visual display apparatus, for example, a head- or face-mounted visual display apparatus that can be retained on the observer's head or face.

2. Background of Related Art

For a head-mounted visual display apparatus, it is important to minimize the overall size and weight thereof in order to make the observer feel comfortable when wearing it. An essential factor in determining the overall size of the apparatus is the layout of the optical system.

FIG. 24 shows the optical system of one conventional head-mounted visual display apparatus [Japanese Patent Application Laid-Open (KOKAI) No. 3-101709 (1991)]. In this visual display apparatus, an image that is displayed by a two-dimensional image display device is transmitted as an aerial image by a relay optical system including a positive lens, and the aerial image is projected into an observer's eyeball as an enlarged image by an ocular optical system formed from a concave reflecting mirror. A direct-vision layout has also been known in which an enlarged image of a two-dimensional image display device is observed directly through a convex lens. With these conventional layouts, the amount to which the apparatus projects from the observer's face is unfavorably large. Further, it is necessary in order to provide a wide view angle for observation to use a positive lens having a large diameter and a large two-dimensional image display device. Accordingly, the apparatus inevitably becomes increasingly large in size and heavy in weight.

To enable the observer to use the visual display apparatus for a long time without fatigue and to attach and detach the apparatus with ease, it is preferable to adopt an arrangement in which a short and lightweight ocular optical system is disposed immediately in front of the observer's eyeball. With this arrangement, a two-dimensional image display device, an illuminating optical system, etc. can be disposed so that the apparatus projects forwardly from the observer's head to a minimal extent. Thus, it is possible to reduce the amount of projection of the apparatus and also the weight thereof.

Next, it is necessary to ensure a wide angle of view in order to enhance the feeling of being at the actual spot which is given to the observer when viewing the displayed image. In particular, the stereoscopic effect of the image presented is determined by the angle at which the image is presented (see The Journal of the Institute of Television Engineers of Japan Vol. 45, No. 12, pp. 1589–1596 (1991)). The next matter of great concern is how to realize an optical system which provides a wide angle of view and high resolution. It is known that it is necessary in order to present a stereoscopic and powerful image to the observer to ensure a viewing angle of 40° (±20°) or more in the horizontal direction, and that the stereoscopic and other effects are saturated in the vicinity of 120° (±60°). In other words, it is preferable to select an angle of view which is not smaller than 40° and which is as close to 120° as possible.

Incidentally, U.S. Pat. No. Re. 27,356 discloses an ocular optical system which, as shown in FIG. 25, uses a semitransparent concave mirror 6 and a semitransparent plane mirror 16 to project an object surface 62 in at a distance. With this arrangement, the optical path from the image display device 62 to the observer's eyeball position 66 can be shortened by repeated reflection of light rays, and it is possible to reduce the amount to which the visual display apparatus projects forwardly from the observer's head.

However, since the concave mirror 6 produces a strong curvature of field along the surface thereof because of its nature, if a planar two-dimensional image display device is disposed at the focal point of the concave mirror 6, the resulting observation image surface is curved, so that it is impossible to obtain an image for observation which is clear as far as the edges of the visual field. Therefore, it is necessary to correct the field curvature by curving the object surface 62.

In general, when a CRT is used as a display device, a curved display surface can be realized with relative ease. However, CRTs are heavier in weight than liquid crystal devices. Further, in order to provide the observer with an image which is clear as far as the edges of visual field at a wide angle of view, it is necessary to use a two-dimensional image display device which has a large size and a high pixel density, and it is preferable to use a thin and lightweight image display device, e.g., an LCD. However, it is extremely difficult to curve the display surface of a planar image display device, e.g., an LCD, on account of the structure thereof.

Accordingly, even if the above-described ocular optical system is used, it has heretofore been difficult to realize a compact and lightweight visual display apparatus which enables observation of an image which is clear as far as the edges the of visual field at a wide viewing angle.

SUMMARY OF THE INVENTION

In view of the above-described problems of the conventional technique, an object of the present invention is to provide a compact and lightweight visual display apparatus having high resolution and a large exit pupil diameter, which enables observation of an image that is flat and clear as far as the edges of visual field at a wide viewing angle of 30° (±15°) or more by using a planar two-dimensional image display device.

Another object of the present invention is to provide a compact visual display apparatus which enables an observation image to be viewed at a distance even in a narrow space at a wide viewing angle of 60° or more and which provides a composite image in which the joint of a pair of adjacent images is not conspicuous.

To attain the above-described objects, the present invention provides a visual display apparatus including an image display device for displaying an image, and an ocular optical system for projecting the image formed by the image display device and leading it to an observer's eyeball. The ocular optical system has a first semitransparent reflecting surface which has a center of curvature substantially on an optical axis and which has a concave surface directed toward the curvature center, and a second semitransparent reflecting surface which has a center of curvature at approximately the same position as the curvature center of the first semitransparent reflecting surface.

According to another aspect of the present invention, there is provided a visual display apparatus including at least two image display devices arranged to display images, respectively, which are different in direction from each other. The visual display apparatus further includes at least two ocular optical systems each formed from a concentric optical system having a first semitransparent reflecting surface which has a center of curvature substantially on an optical axis and which has a concave surface directed toward the curvature center, and a second semitransparent reflecting surface which has a center of curvature at approximately the same position as the curvature center of the first semitransparent reflecting surface.

In the above-described arrangements, the first and second semitransparent reflecting surfaces of the ocular optical system are preferably arranged such that a bundle of rays passing through the first semitransparent reflecting surface is reflected by the second semitransparent reflecting surface, and the ray bundle reflected by the second semitransparent reflecting surface is reflected by the first semitransparent reflecting surface and then passes through the second semitransparent reflecting surface. The two semitransparent reflecting surfaces of each concentric optical system are preferably disposed with their concave surfaces directed toward the observer.

Further, the ocular optical system preferably has at least two semitransparent reflecting surfaces each of which has a center of curvature disposed in the vicinity of the pupil of an observer's eyeball and which has a concave surface directed toward the pupil. The semitransparent reflecting surfaces are preferably disposed so that each semitransparent reflecting surface transmits light rays at least once and reflects them at least once.

It is also preferable that the refractive power of the ocular optical system for light rays passing therethrough without being reflected by either of the semitransparent reflecting surfaces should be substantially zero.

Further, the visual display apparatus preferably has a cut-off device including a polarizing optical element for cutting off light rays passing through the ocular optical system without being reflected by either of the two semitransparent reflecting surfaces.

Further, the visual display apparatus preferably has a device for positioning both the image display device and the ocular optical system with respect to the observer's head.

Further, the visual display apparatus preferably has a device for supporting both the image display device and the ocular optical system with respect to the observer's head so that the apparatus can be fitted to the observer's head.

It addition, it is preferable to provide a device for supporting at least two sets of the above-described visual display apparatus with a predetermined spacing therebetween.

Further, it is preferable to satisfy the following condition:

$$0.5 < |R_1/R_2| < 1.8 \tag{2}$$

where $R_1$ and $R_2$ are the radii of curvature of the first and second semitransparent reflecting surfaces.

It is also preferable to satisfy the following condition:

$$0.4 < |(D_1+D_2)/R_2| < 1.7 \tag{3}$$

where $R_2$ is the radius of curvature of the second semitransparent reflecting surface; $D_1$ is the distance from the pupil to the first semitransparent reflecting surface, which is closer to the pupil; and $D_2$ is the surface separation between the first and second semitransparent reflecting surfaces.

It is also preferable to satisfy the following condition:

$$1 < (|R_1|+D_2)/|R_2| < 1.8 \tag{4}$$

where $R_1$ is the radius of curvature of the first semitransparent reflecting surface, which is closer to the pupil; $R_2$ is the radius of curvature of the second semitransparent reflecting surface, which is remoter from the pupil; and $D_2$ is the surface separation between the first and second semitransparent reflecting surfaces.

It is also preferable to satisfy the following condition:

$$|D_1/R_1| < 1.5 \tag{5}$$

where $R_1$ is the radius of curvature of the first semitransparent reflecting surface, which is closer to the pupil, and $D_1$ is the distance from the pupil to the first semitransparent reflecting surface.

The reason for adopting the above-described arrangements in the present invention and the functions thereof will be explained below.

The present invention has been made to solve the above-described problems, and is characterized by using, as an ocular optical system for projecting an image displayed on an image display device and for leading it to an observer's eyeball, an optical system having a first semitransparent reflecting surface which has a center of curvature substantially on an optical axis and which has a concave surface directed toward the curvature center, and a second semitransparent reflecting surface which has a center of curvature at approximately the same position as the curvature center of the first semitransparent reflecting surface.

In the following description, the ocular optical system of the present invention will be explained as an imaging optical system by using backward tracing in which light rays are traced from the exit pupil position toward the object surface for the convenience of description. It should, however, be noted that in the actual optical system of the present invention light rays travel in the reverse direction with the image surface as an object point.

The optical system of the present invention, in which the centers of curvature of the two semitransparent reflecting surfaces are disposed at approximately the same position, is generally called a "concentric optical system". FIG. 1 is a view used to explain the basic arrangement of the concentric optical system according to the present invention and the reason why the amount of aberration occurring in the concentric optical system is small. In FIG. 1, reference numeral 1 denotes a pupil position, 2 a first semitransparent reflecting surface, 3 a second semitransparent reflecting surface, and 4 an image surface. FIG. 1 illustrates an optical ray trace of an arrangement in which the center of curvature of the first surface 2 and that of the second surface 3 are perfectly coincident with the pupil position 1. It will be understood from the figure that since the pupil position 1 and the centers of curvature of the first and second surfaces 2 and 3 are coincident with each other, axial rays and off-axis rays are rotationally symmetric with respect to the pupil position 1. This means that neither astigmatism nor coma, which are off-axis aberrations, occurs. In addition, since all the surfaces that have refractive power are reflecting surfaces, no chromatic aberration occurs either in theory. In a case where the F-number is 2 or less, the occurrence of spherical aberration can also be virtually ignored. However, the image surface formed by the second surface 3 is a spherical surface centered at the pupil position 1. Therefore, field curvature can occur.

In the concentric optical system of the present invention, light rays are repeatedly reflected between the two semitransparent reflecting surfaces 2 and 3 in the same way as in U.S. Pat. No. Re. 27,356 (shown in FIG. 25). Therefore, the mechanical length from the position of the entrance pupil 1 to the image surface 4 can be made shorter than that in a lens system formed by using a single convex lens or the like. Accordingly, by using the concentric optical system as an ocular optical system, it is possible to form a compact visual display apparatus which projects from the observer's face to a minimal extent.

The present invention has succeeded in effectively correcting the field curvature in the concentric optical system, in which the amount of aberration produced is exceedingly small, as has been described above. The scheme of correcting the field curvature according to the present invention will be explained below.

In U.S. Pat. No. Re. 27,356 (shown in FIG. 25), the field curvature produced by the concave mirror 6 is corrected by curving the image surface (the object surface in the present invention) 62. In general, however, it is extremely difficult to curve the display surface of a liquid crystal display device, although it is relatively easy to form a two-dimensional image display device with a curved display surface by using a CRT.

Therefore, in the present invention, the field curvature produced by the concave mirror 3 is corrected by the convex mirror 2, as shown in FIG. 1.

That is, Petzval sum PS, which is generally regarded as indicating an amount of field curvature produced, is expressed by $$PS = \Sigma(1/n \cdot f) \tag{1}$$

where n is the refractive index, and f is the focal length of the surface.

In the case of the optical system of U.S. Pat. No. Re. 27,356, which is equivalent to an arrangement in which the convex mirror 2 in the present invention is replaced by the plane mirror 16, Petzval sum occurring when rays are reflected by the concave mirror 6 is not corrected at all because the focal length of the plane mirror 16 is infinity. Therefore, in the present invention, the convex mirror 2 is used in place of the plane mirror 16, thereby enabling the Petzval sum produced by the concave mirror 3 to be corrected by the convex mirror 2.

Further, when a two-dimensional image display device such as an LCD is viewed obliquely, the contrast lowers, causing the visual characteristics to be degraded. Therefore, it is desired to use light rays emanating from the two-dimensional image display device perpendicularly to the surface thereof, as much as possible, as light rays to be projected into the observer's eyeball. In other words, the pupil plane 1 must not be present in the vicinity of the concave mirror 3 or the convex mirror 2 or at a position closer to the image side than the concave mirror 3 in order to allow off-axis chief rays emanating from the ocular optical system to be parallel to the optical axis. That is, it is essential to dispose the pupil plane 1 at a position closer to the center of curvature of the concave mirror 3.

Further, it is preferable to satisfy the following conditions in order to carry out favorable aberration correction. The following conditional expressions correspond to various aberrations, respectively, and they are independent of each other under actual use conditions, e.g., the angle of view, F-number, etc; there is no correlation between the conditional expressions. It may be necessary to satisfy all the conditions, depending upon the use conditions.

First, the relationship between the first and second surfaces 2 and 3 will be explained. Correction of the Petzval sum is particularly important in order to realize favorable aberration correction, as has been described above. In the present invention, it is essential in order to correct the Petzval sum to satisfy the following condition:

$$0.5 < |R_1/R_2| 1.8 \tag{2}$$

where $R_1$ is the radius of curvature of the first surface 2, and $R_2$ is the radius of curvature of the second surface 3.

The condition (2) specifies the power distribution to the positive second surface 3 and the negative first surface 2. If $|R_1/R_2|$ is not larger than the lower limit, i.e., 0.5, the balance of aberrations, mainly Petzval sum, corrected by the first and second surfaces 2 and 3 is destroyed, and a large negative Petzval sum is produced. If $|R_1/R_2|$ is not smaller than the upper limit, i.e., 1.8, a large positive Petzval sum is produced, so that it becomes impossible to correct the Petzval sum by another surface.

In a case where it is necessary to comply with the demand for high-definition images as represented by those in high-vision TV in recent years, the Petzval sum must be corrected even more effectively, and it is essential to satisfy the following condition:

$$0.7 < |R_1/R_2| < 1.7 \tag{7}$$

Next, the second semitransparent reflecting surface 3 will be explained. Assuming that the distance from the pupil plane 1 to the first surface 2 is $D_1$, and the surface separation between the first and second surfaces 2 and 3 is $D_2$, it is preferable to satisfy the following condition:

$$0.4 < |(D_1 + D_2)/R_2| < 1.7 \tag{3}$$

If $|(D_1+D_2)/R_2|$ is not larger than the lower limit, i.e., 0.4, the inclination of the chief ray of emergent light passing through the second surface 3 becomes excessively large, and large negative astigmatism and coma occur. If $|(D_1+D_2)/R_2|$ is not smaller than the upper limit, i.e., 1.7, the amount of negative astigmatism and coma decreases. Consequently, the positive astigmatism and coma produced in the entire lens system undesirably increase because the negative astigmatism and coma are produced to cancel the positive astigmatism and coma produced when the rays pass through the first surface 2.

Further, it is essential in the present invention that the second surface 3 be concentric. Assuming that the radius of curvature of the first surface 2 is $R_1$, the radius of curvature of the second surface 3 is $R_2$, and the surface separation between the first and second surfaces 2 and 3 is $D_2$, it is essential to satisfy the following condition:

$$1 < |(|R_1|+D_2)/R_2| < 1.8 \tag{4}$$

The condition (4) must be satisfied in order to enable the coma and astigmatism produced by the second surface 3 to be corrected by the entire system. If $|(|R_1|+D_2)/R_2|$ is not larger than the lower limit, i.e., 1, the system becomes close to a perfect concentric optical system, so that it becomes impossible to correct the Petzval sum. As a result, a large field curvature occurs. If $|(|R_1|+D_2)/R_2|$ is not smaller than the upper limit, i.e., 1.8, the angle of incidence of the chief ray on the second surface 3 becomes large, causing the positive comatic aberration to increase. In either case, it becomes impossible to form an image which is clear as far as the edges of the visual field.

Further, it is preferable to satisfy the following condition:

$$|D_1/R_1| < 1.5 \tag{5}$$

where $D_1$ is the distance from the pupil plane 1 to the first surface 2, and $R_1$ is the radius of curvature of the first surface 2.

If $|D_1/R_1|$ is not smaller than the upper limit, i.e., 1.5, the height of the chief ray incident on the first surface 2 undesirably increases, resulting in an increase in the amount of positive coma and astigmatism produced. Consequently, it becomes impossible to form an image which is clear as far as the edges of visual field.

Next, the surface separation will be explained. Assuming that the surface separation between the pupil plane 1 and the first surface 2 is $D_1$, and the focal length of the entire system is F, it is essential to satisfy the following condition:

$$D_1/F < 1.6 \tag{7}$$

The condition (7) must be satisfied in order to minimize the comatic aberration produced by the first surface 2. If $D_1/F$ is not smaller than the upper limit, i.e., 1.6, the comatic aberration produced by the first surface 2 becomes large, so that it becomes impossible to correct it by another surface. In a case where the optical system of the present invention is used as an ocular optical system, it is essential to satisfy the following condition:

$$0.5 < D_1/F \tag{8}$$

In the case of an ocular optical system, the condition (8) is concerned with the eye point of an ocular lens. If $D_1/F$ is not larger than the lower limit, i.e., 0.5, the observer's pupil position and the exit pupil position 1 of the ocular optical system are displaced from each other, and it becomes impossible to observe the entire field of view.

Assuming that the surface separation between the first and second surfaces 2 and 3 is $D_2$, it is essential to satisfy the following condition:

$$0.2 < D_2/F < 0.7 \tag{9}$$

The condition (9) must be satisfied in order to obtain a balance of the Petzval sum produced by the first surface 2 and the Petzval sum produced by the second surface 3. If $D_2/F$ is not smaller than the upper limit, i.e., 0.7, or not larger than the lower limit, i.e., 0.2, the balance of the aberrations produced by the first and second surfaces 2 and 3 is destroyed, resulting in a large difference between the Petzval sums, which should cancel each other substantially.

To cut off flare light that passes through the first and second surfaces 2 and 3 and reaches the image surface 4 without being reflected by either of the first and second surfaces 2 and 3, it is essential to use polarizing optical elements, which utilize polarization. For example, a first polarizing plate and a first quarter-wave plate are disposed at the side of the first surface 2 which is closer to the pupil plane 1 to circularly polarize the incident light. In addition, a second quarter-wave plate is disposed between the first and second semitransparent reflecting surfaces 2 and 3, and a second polarizing plate is disposed in parallel Nicol relation to the first polarizing plate behind the second semitransparent reflecting surface 3. With this arrangement, normal rays which are reflected once by each of the first and second surfaces 2 and 3 pass through the second quarter-wave plate, which is disposed between the first and second surfaces 2 and 3, three times. Thus, the normal rays pass through the first and second quarter-wave plates four times in total. Accordingly, the light passing through the first polarizing plate passes through the second polarizing plate, which is disposed in parallel Nicol relation to the first polarizing plate, without the plane of polarization being rotated. However, rays that pass through the first semitransparent reflecting surface 2 without being reflected pass through the quarter-wave plates only twice in total; therefore, the plane of polarization is rotated through 90°, and these rays are cut off by the second polarizing plate.

Thus, flare light can be cut off by using polarizing optical elements as described above. It should be noted that it is also possible to employ a polarizing optical element arrangement other than that described above, and that the above-described arrangement is merely an example.

The visual display apparatus according to the present invention can be arranged in the form of a portable visual display apparatus, such as a stationary or head-mounted visual display apparatus, which allows the user to observe a displayed image with both eyes by preparing a pair of such combinations of a concentric optical system and a two-dimensional image display device for the user's left and right eyes, and supporting them apart from each other by a distance corresponding to the spacing between the two eyes. FIG. 2(a) is a perspective view showing one example in which the visual display apparatus of the present invention is incorporated into a game machine M as a stationary visual display apparatus. FIG. 2(b) is an enlarged view of the eyepiece part S. The eyepiece part S is provided at both sides thereof with projections 7 for positioning the observer's head H with respect to the eyepiece part S from both sides when the observer looks into the visual display apparatus with the head H pressed against the eyepiece part S. FIG. 3 is a perspective view showing one example in which the visual display apparatus of the present invention is arranged in the form a goggle type head-mounted visual display apparatus G. In this example, a headband 8 is used to support the visual display apparatus G on the observer's head. Thus, the visual display apparatus of the present invention becomes more observable by having a device for determining the relative position thereof with respect to the observer's eyeballs. The reason for this is that the exit pupil diameter of each optical system in the apparatus is limited, although it is large. Therefore, unlike the TV screen, the image displayed by this apparatus cannot necessarily be observed from any direction.

To obtain, particularly, a wide view angle for observation, the visual display apparatus of the present invention may be arranged as follow: At least two ocular optical systems, which are formed from concentric optical systems arranged as described above, are provided, and two-dimensional image display devices associated with these ocular optical systems are arranged to display respective images different in direction from each other. The displayed images are projected into the observer's eyeballs as an enlarged image by the concentric optical systems in such a manner that the visual fields are combined together to provide a wide view angle. Thus, despite a compact structure, the apparatus allows the observer to view the displayed image in a distance at a wide view angle with the joint of the two-dimensional image display devices made inconspicuous.

FIG. 4(a) is a horizontal sectional view of one example of the visual display apparatus taken along a plane above the observer's head, in which a plurality of ocular optical systems arranged as described above are provided, and the visual fields of two-dimensional image display devices, which display respective images different in direction from each other, are combined together to provide a wide view angle by the concentric optical systems. In the figure, reference numeral 1 denotes an observation position for the observer, 2 a first semitransparent reflecting surface, 3 a second semitransparent reflecting surface, and 4 the display surface of a two-dimensional image display device. In this example, five planar image display devices 4 and five concentric optical systems, each composed of a pair of first and second semitransparent reflecting surfaces 2 and 3, are joined together to constitute a visual display apparatus.

Another combination of an image display device 4 and a concentric optical system may be provided above the head of the observer 1 as shown in FIG. 4(b). Alternatively, the arrangement may be modified so that an observation image is displayed in a field of the order of 120° in front of the observer 1. It should be noted that reference symbol P in FIG. 4(b) denotes polarizing optical elements for cutting off light rays reaching the observer 1 directly without being reflected by either of the two semitransparent reflecting surfaces 2 and 3.

More specifically, assuming that the focal length F of each concentric optical system is 1 m, the curvature radius of the first semitransparent reflecting surface 2 is 1,228 mm. The distance between the first semitransparent reflecting surface 2 and the observer 1 is 597 mm. Since the F-number is 3, an exit pupil diameter of 333 mm can be obtained. Accordingly, even if the observer 1 moves his/her head slightly, he or she can see the displayed image without fail. For domestic use, the focal length F is preferably set at about 500 mm with a view to minimizing the overall size of the apparatus.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 15(a)(1) to 15(a)(3) show longitudinal aberration curves illustrating spherical aberration, astigmatism and distortion in the first example.

FIGS. 15(b)(1) to 15(b)(6) show lateral aberration curves in the first example.

FIGS. 16(a)(1) to 16(a)(3) and 16(b)(1) to 16(b)(6) graphically show various aberrations in the second example in the same way as in FIGS. 15(a)(1) to 15(a)(3) and 15(b)(1) to 15(b)(6).

FIGS. 17(a)(1) to 17(a)(3) and 17(b)(1) to 17(b)(6) graphically show various aberrations in the third example in the same way as in FIGS. 15(a)(1) to 15(a)(3) and 15(b)(1) to 15(b)(6).

FIGS. 18(a)(1) to 18(a)(3) and 18(b)(1) to 18b)(6) graphically show various aberrations in the fourth example in the same way as in FIGS. 15(a)(1) to 15(a)(3) and 15(b)(1) to 15(b)(6).

FIGS. 19(a)(1) to 19(a)(3) and 19(b)(1) to 19(b)(6) graphically show various aberrations in the fifth example in the same way as in FIGS. 15(a)(1) to 15(a)(3) and 15(b)(1) to 15(b)(6).

FIGS. 20(a)(1) to 20(a)(3) and 20(b)(1) to 20(b)(6) graphically show various aberrations in the sixth example in the same way as in FIGS. 15(a)(1) to 15(a)(3) and 15(b)(1) to 15(b)(6).

FIGS. 21(a)(1) to 21(a)(3) and 21(b)(1) to 21(b)(6) graphically show various aberrations in the seventh example in the same way as in FIGS. 15(a)(1) to 15(a)(3) and 15(b)(1) to 15(b)(6).

FIGS. 22(a)(1) to 22(a)(3) and 22(b)(1) to 22(b)(10) graphically show various aberrations in the eighth example in the same way as in FIGS. 15(a)(1) to 15(a)(3) and 15(b)(1) to 15(b)(6).

FIGS. 23(a)(1) to 23(a)(3) and 23(b)(1) to 23(b)(10) graphically shows various aberrations in the ninth example in the same way as in FIGS. 15(a)(1) to 15(a)(3) and 15(b)(1) to 15(b)(6).

DESCRIPTION OF THE PREFERRED EMBODIMENTS

First to tenth examples of the optical system of the visual display apparatus according to the present invention will be described below with reference to the accompanying drawings.

Figure 1:
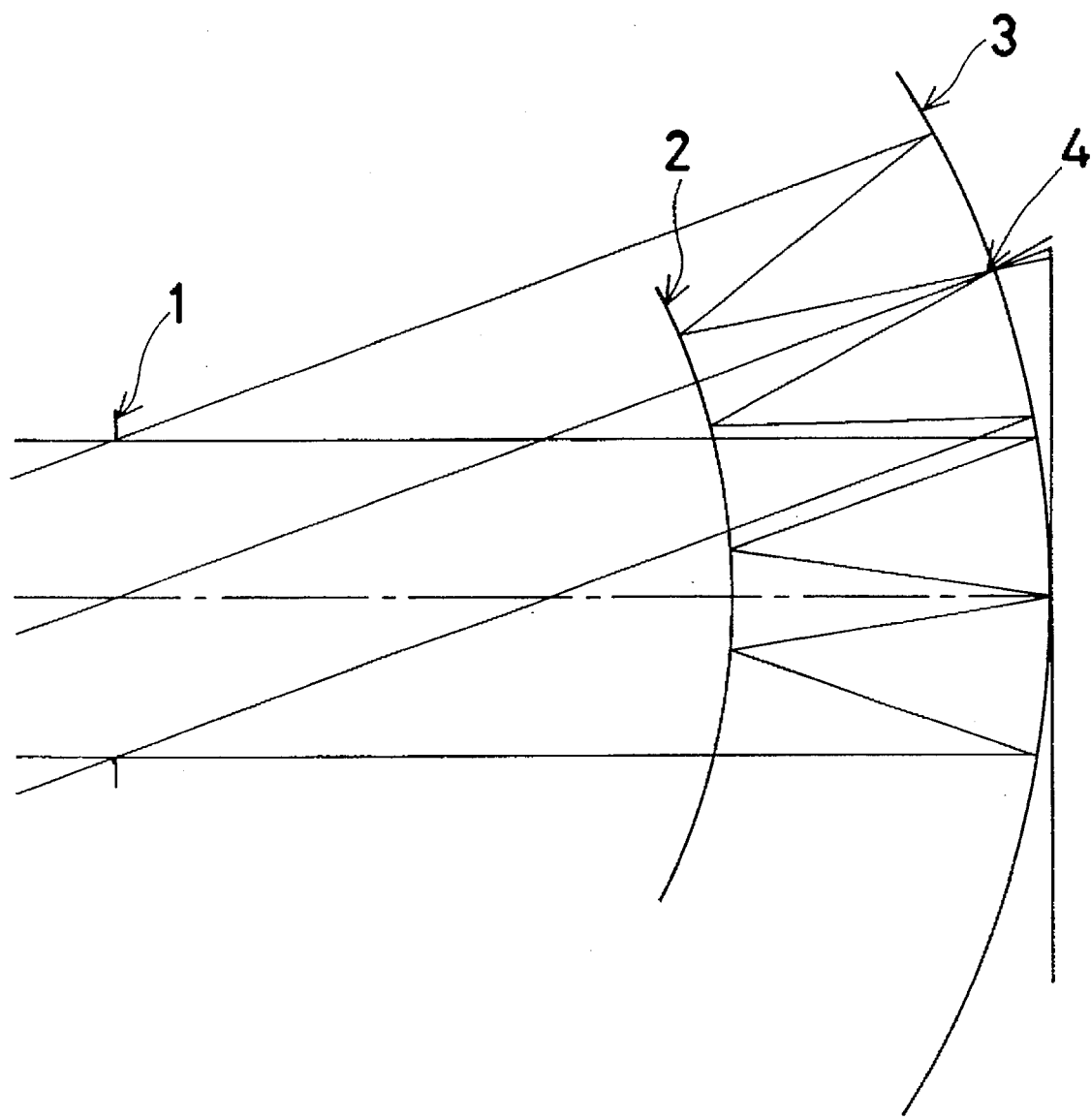
FIG. 1 is a view used to explain the basic arrangement of a concentric optical system used as an ocular optical system according to the present invention and the reason why the amount of aberration occurring in the concentric optical system is small.
Figure 2A:
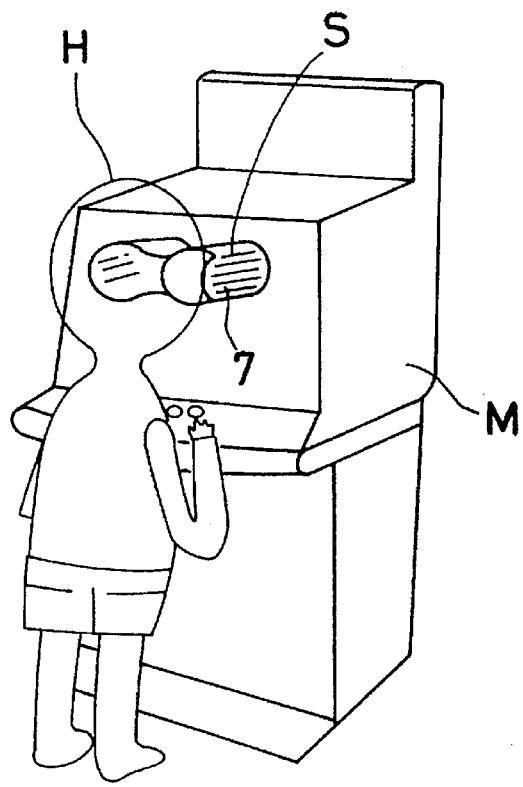
FIG. 2(a) is a perspective view showing one example in which the visual display apparatus of the present invention is incorporated into a game machine as a stationary visual display apparatus.
Figure 2B:
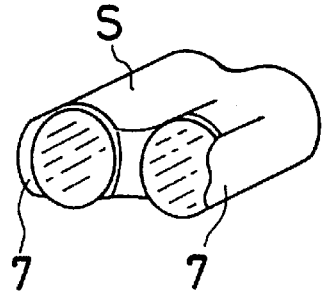
FIG. 2(b) is an enlarged view of an eyepiece part of the stationary visual display apparatus shown in FIG. 2(a).
Figure 3:
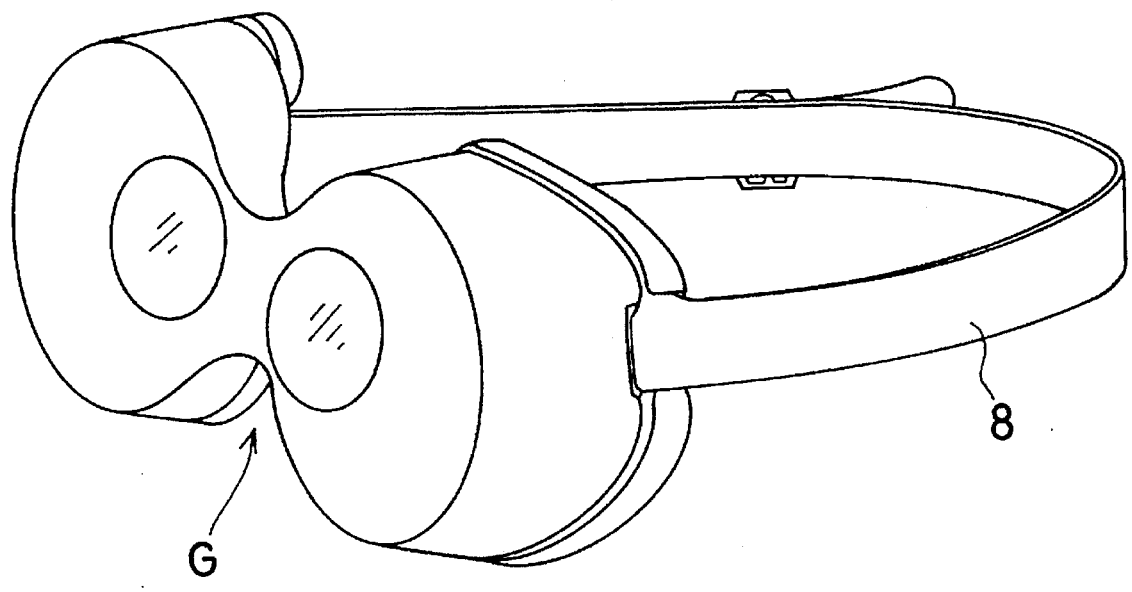
FIG. 3 is a perspective view showing one example in which the visual display apparatus of the present invention is arranged in the form of a goggle-type head-mounted visual display apparatus.
Figure 4A:
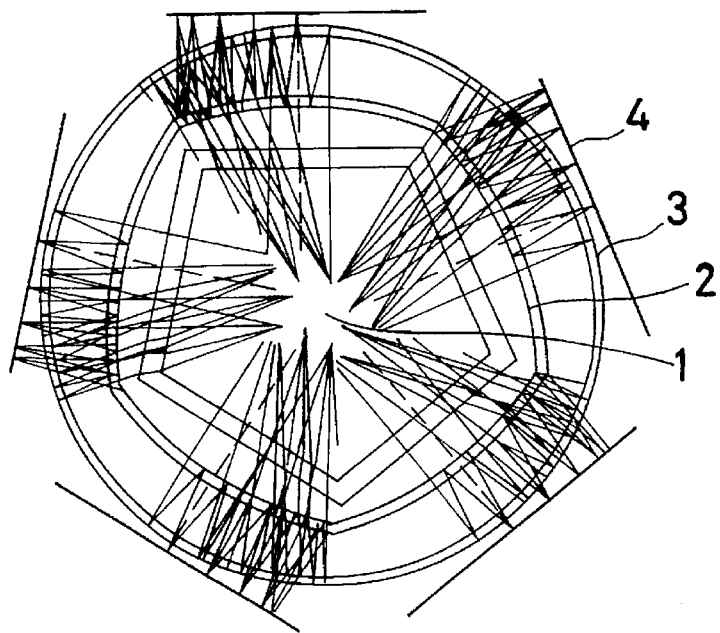
FIGS. 4(a) and 4(b) are horizontal and vertical sectional views showing one example in which the visual display apparatus of the present invention is arranged in the form of a 360°-type stationary visual display apparatus.
Figure 4B:
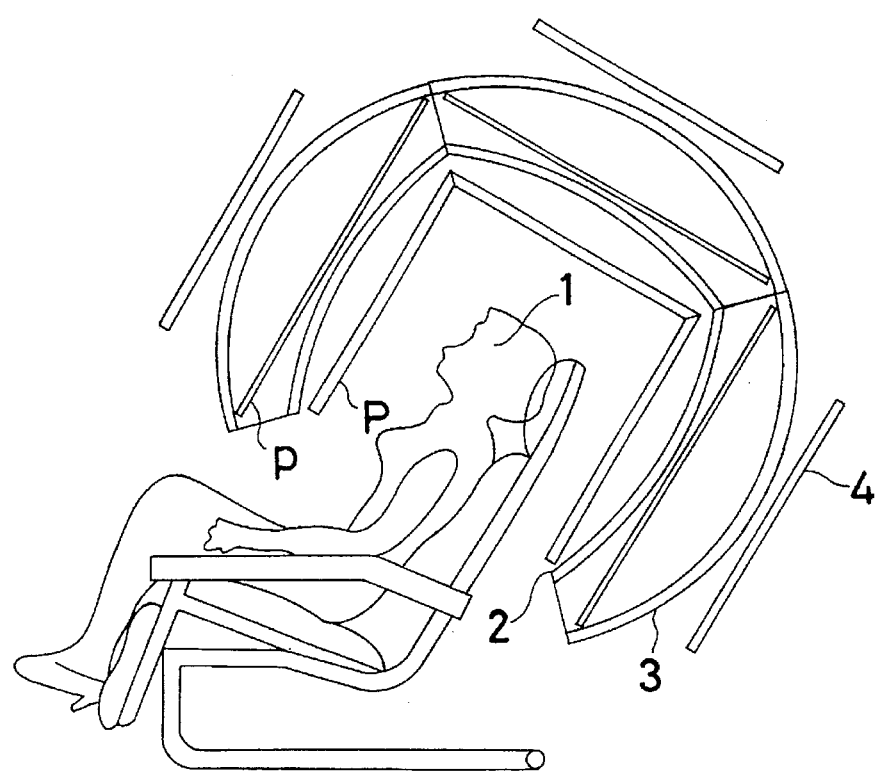
Figure 5:
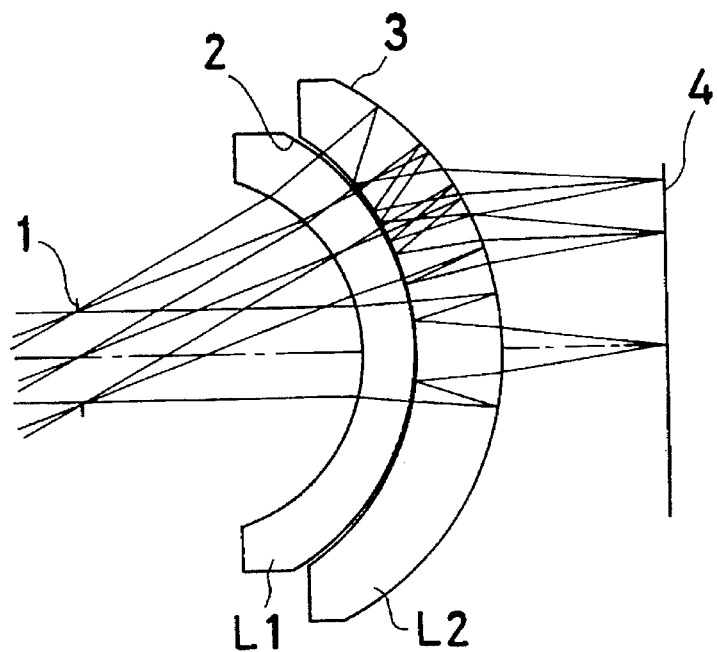
FIG. 5 is a sectional view showing the optical system of a first example of the visual display apparatus according to the present invention.

First Example:

A first example of the present invention will be explained below with reference to FIG. 5. Numerical data in this example will be shown later. In the figure, reference numeral 1 denotes a pupil position, 2 a first semitransparent reflecting surface, 3 a second semitransparent reflecting surface, and 4 an image surface. It should be noted that in actual practice a two-dimensional image display device, e.g., an LCD, is disposed at the image surface 4, and light rays travel in the reverse direction (the same shall apply to the following examples). In this example, two meniscus lenses L1 and L2 are employed. The convex surface of the meniscus lens L1 is used as the first semitransparent reflecting surface 2, and the convex surface of the meniscus lens L2 is used as the second semitransparent reflecting surface 3. In the following numerical data, nd denotes the refractive index of lens for the spectral d-line, and vd denotes the Abbe's number (the same shall apply hereinafter).

In this example, the angle of view is 45°, the focal length F is 10 mm, and F-number is 3.5.

FIGS. 15(a)(1) to 15(a)(3) show longitudinal aberration curves illustrating spherical aberration, astigmatism and distortion in this example, and FIGS. 15(b)(1) to 15(b)(6) lateral aberration curves in this example.

Figure 6:
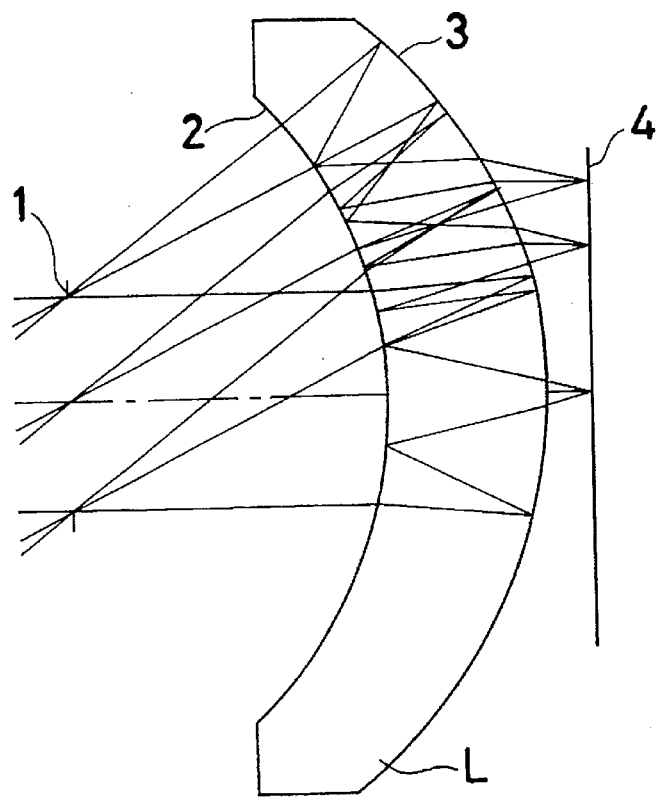
FIG. 6 is a sectional view of a second example of the present invention.

Second Example:

A second example of the present invention will be explained below with reference to FIG. 6. Numerical data will be shown later. In the figure, reference numeral 1 denotes a pupil position, 2 a first semitransparent reflecting surface, 3 a second semitransparent reflecting surface, and 4 an image surface. In this example, one meniscus lens L is employed, and the concave surface thereof is used as the first semitransparent reflecting surface 2, while the convex surface thereof is used as the second semitransparent reflecting surface 3. In this example, the angle of view is 60°, the focal length F is 10 mm, and the F-number is 1.5.

FIGS. 16(a)(1) to 16(a)(3) and 16(b)(1) to 16(b)(6) graphically show various aberrations in this example in the same way as in FIGS. 15(a)(1) to 15(a)(3) and 15(b)(1) to 15(b)(6).

In this example, the focal length with respect to light rays passing through the ocular optical system without being reflected by either of the semitransparent reflecting surfaces 2 and 3 is 500 mm. Assuming that the focal length is F and the refractive power is ø,

ø=1/F

In this example,

ø=0.002

In this case, it becomes possible to observe an outside world image through the ocular optical system by removing the image display device 4 from the front of the ocular optical system. In other words, a peripheral image other than the observation image can be viewed without removing the apparatus body.

More preferably, the refractive power ø for light rays passing through the ocular optical system without being reflected by either of the semitransparent reflecting surfaces 2 and 3 should satisfy the following condition:

−0.04<ø<0.01

When ø is −0.04, i.e., the lower limit of the above condition, an outside world image in the background is seen as close as 25 cm. If such an outside world image is seen closer than this range, the observer's eyes cannot sufficiently be accommodated to the image. On the other hand, when ø is 0.01, i.e., the upper limit of the above condition, an outside world image at a distance of 1 m can be observed at infinity. If ø exceeds the upper limit, the demand for accommodation is beyond the capability of the observer's eyes, and it becomes impossible to clearly observe the outside world.

Figure 7:
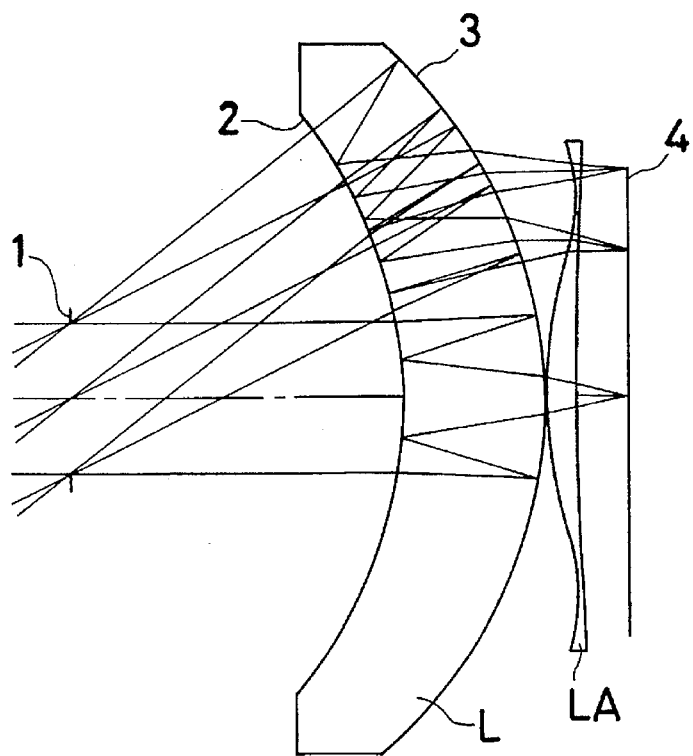
FIG. 7 is a sectional view of a third example of the present invention.

Third Example:

A third example of the present invention will be explained below with reference to FIG. 7. Numerical data in this example will be shown later. In the figure, reference numeral 1 denotes a pupil position, 2 a first semitransparent reflecting surface, 3 a second semitransparent reflecting surface, and 4 an image surface. In this example, one meniscus lens L is employed, and the concave surface thereof is used as the first semitransparent reflecting surface 2, while the convex surface thereof is used as the second semitransparent reflecting surface 3. In addition, an aspherical lens LA for image distortion correction is disposed at the side of the meniscus lens L which is closer to the image surface 4. In this example, the angle of view is 60°, the focal length F is 10 mm, and the F-number is 2.0.

It should be noted that in the numerical data shown later the aspherical surface is a rotationally symmetric surface expressed by $$Z=(Y^2/R)/[1+\{1-(1+K)(Y/R)^2\}^{1/2}]+AY^4+BY^6+CY^8$$

where K is a conical constant, and A, B and C are aspherical coefficients.

In the above expression, R is the paraxial curvature radius, and the direction of propagation of light along the optical axis is taken as Z-axis, while a direction perpendicularly intersecting the optical axis is taken as Y-axis.

FIGS. 17(a)(1) to 17(a)(3) and 17(b)(1) to 17(b)(6) graphically show various aberrations in this example in the same way as in FIGS. 15(a)(1) to 15(a)(3) and 15(b)(1) 15(b)(6).

Figure 8:
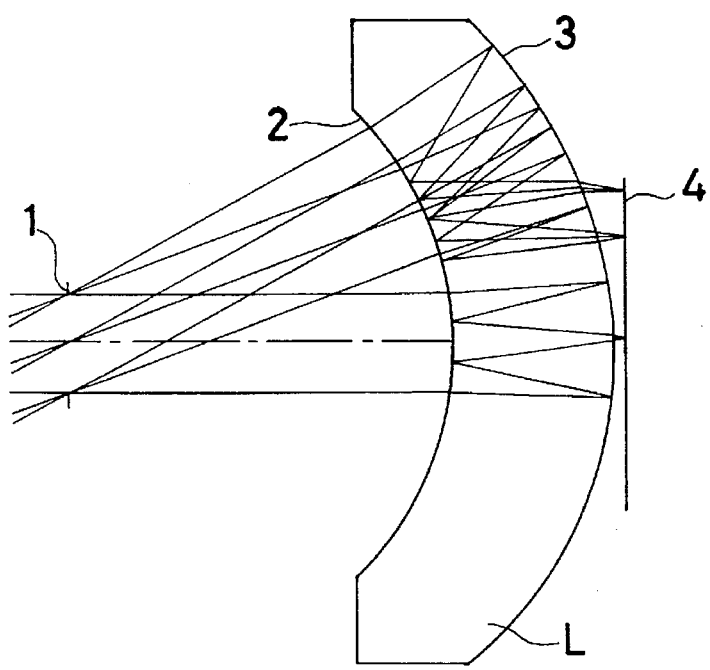
FIG. 8 is a sectional view of a fourth example of the present invention.

Fourth Example:

A fourth example of the present invention will be explained below with reference to FIG. 8. Numerical data in this example will be shown later. This example is similar to the second example. In this example, the angle of view is 45°, the focal length F is 10 mm, and the F-number is 3.0.

FIGS. 18(a)(1) to 18(a)(3) and 18(b)(1) to 18(b)(6) graphically show various aberrations in this example in the same way as in FIGS. 15(a)(1) to 15(a)(3) and 15(b)(1) to 15(b)(6).

Figure 9:
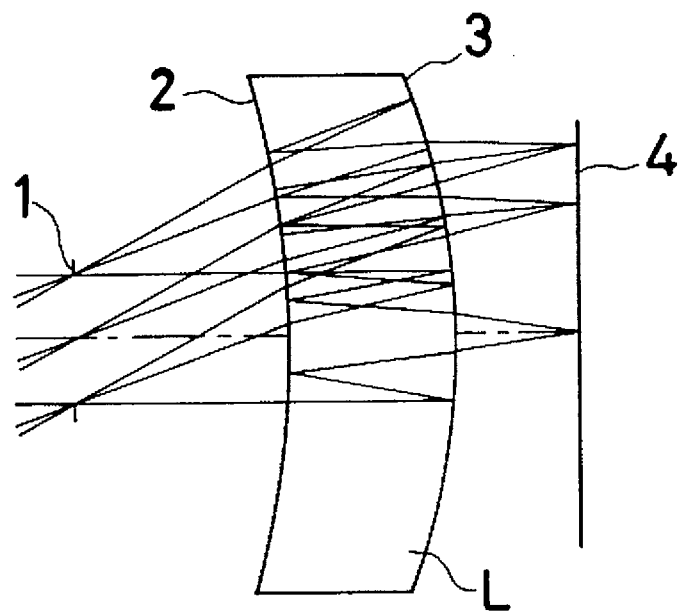
FIG. 9 is a sectional view of a fifth example of the present invention.

Fifth Example:

A fifth example of the present invention will be explained below with reference to FIG. 9. Numerical data in this example will be shown later. This example is also similar to the second example. In this example, the angle of view is 45°, the focal length F is 10 mm, and the F-number is 3.0.

FIGS. 19(a)(1) to 19(a)(3) and 19(b)(1) to 19(b)(6) graphically show various aberrations in this example in the same way as in FIGS. 15(a)(1) to 15(a)(3) and 15(b)(1) to 15(b)(6).

Figure 10:
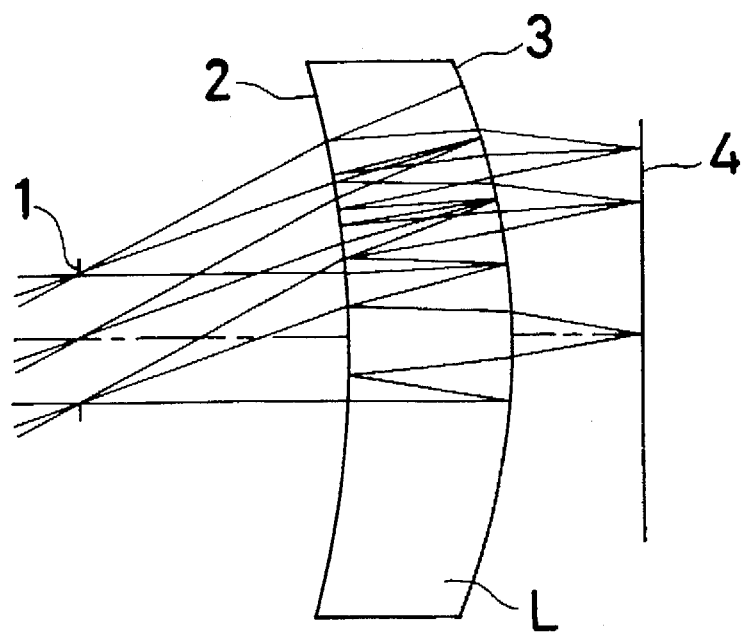
FIG. 10 is a sectional view of a sixth example of the present invention.

Sixth Example:

A sixth example of the present invention will be explained below with reference to FIG. 10. Numerical data in this example will be shown later. This example is also similar to the second example. In this example, the angle of view is 45°, the focal length F is 10 mm, and the F-number is 3.0.

FIGS. 20(a)(1) to 20(a)(3) and 20(b)(1) to 20(b)(6) graphically show various aberrations in this example in the same way as in FIGS. 15(a)(1) to 15(a)(3) and 15(b)(1) to 15(b)(6).

Figure 11:
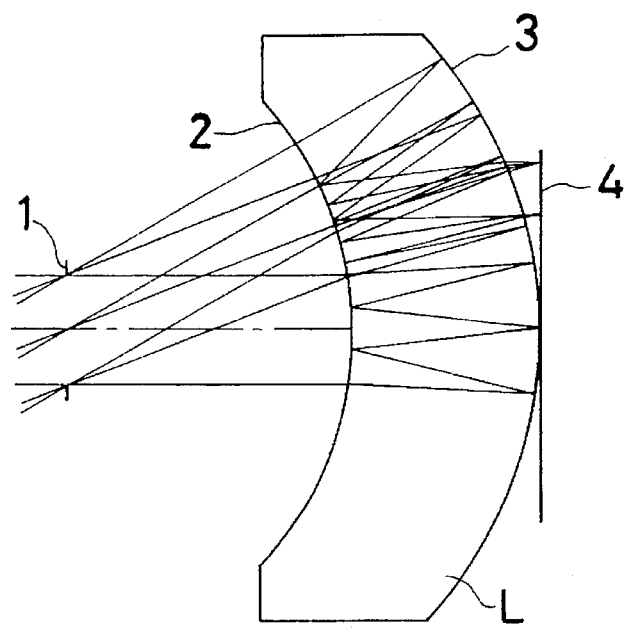
FIG. 11 is a sectional view of a seventh example of the present invention.

Seventh Example:

A seventh example of the present invention will be explained below with reference to FIG. 11. Numerical data in this example will be shown later. This example is also similar to the second example. In this example, the angle of view is 45°, the focal length F is 10 mm, and the F-number is 3.0.

FIGS. 21(a)(1) to 21(a)(3) and 21(b)(1) to 21(b)(6) graphically show various aberrations in this example in the same way as in FIGS. 15(a)(1) to 15(a)(3) and 15(b)(1) to 15(b)(6).

Figure 12:
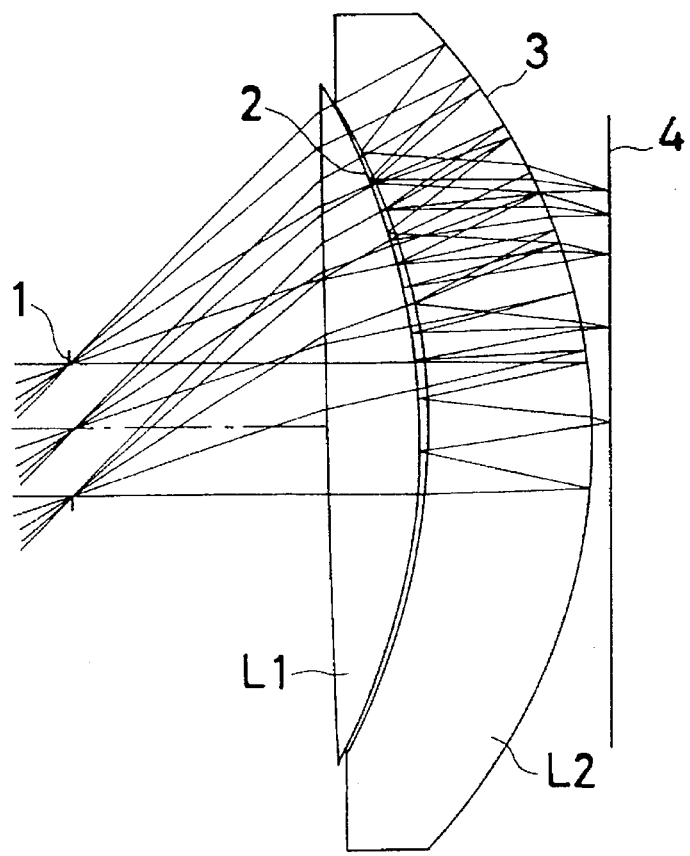
FIG. 12 is a sectional view of an eighth example of the present invention.

Eighth Example:

An eighth example of the present invention will be explained below with reference to FIG. 12. Numerical data in this example will be shown later. This example is approximately similar to the first example. In this example, the angle of view is 70°, the focal length F is 10 mm, and the F-number is 2.5.

FIGS. 22(a)(3) to 22(a)(3) and 22(b)(1) to 22(b)(10) graphically show various aberrations in this example in the same way as in FIGS. 15(a)(1) ti 15(a)(3) and 15(b)(1) to 15(b)(6).

Figure 13:
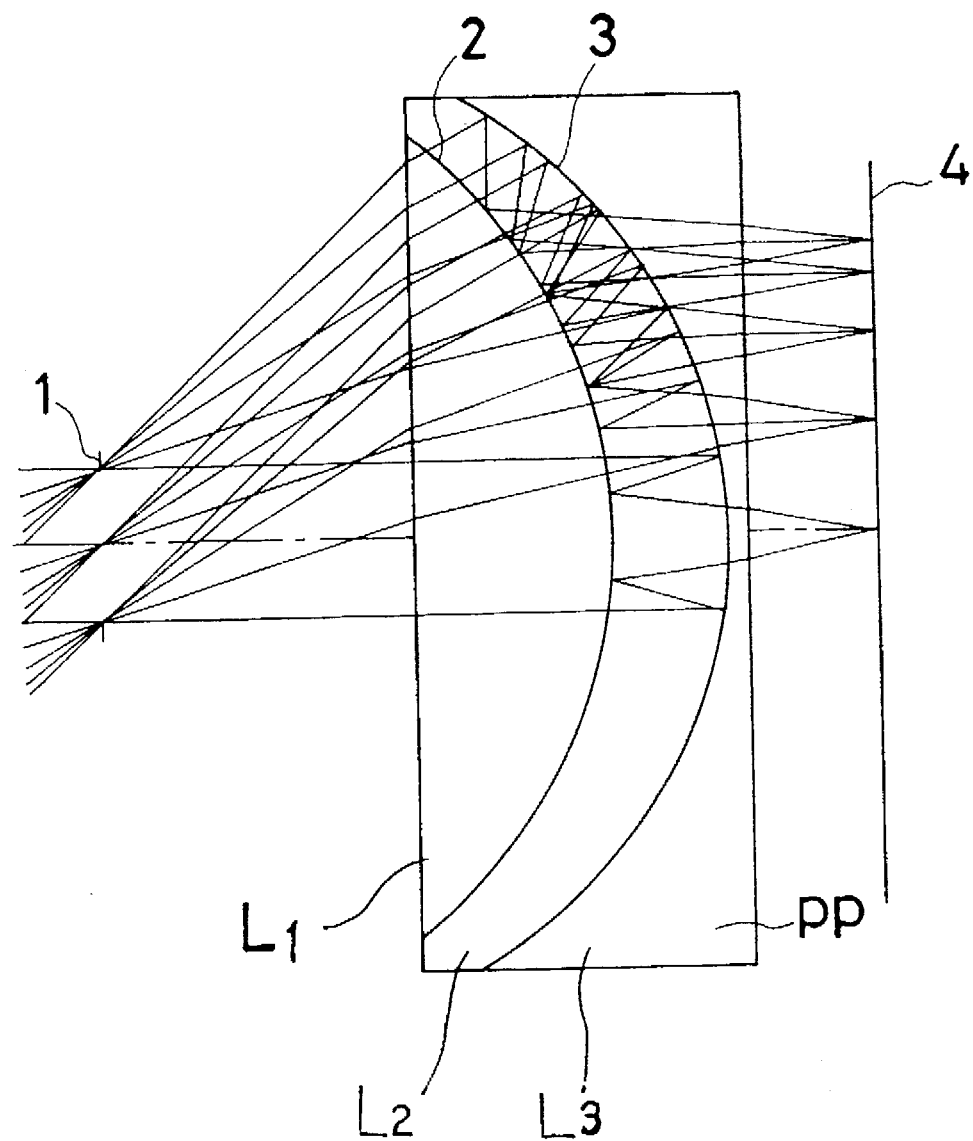
FIG. 13 is a sectional view of a ninth example of the present invention.

Ninth Example:

A ninth example of the present invention will be explained below with reference to FIG. 13. Numerical data in this example will be shown later. In the figure, reference numeral 1 denotes a pupil position, 2 a first semitransparent reflecting surface, 3 a second semitransparent reflecting surface, and 4 an image surface. In this example, the first semitransparent reflecting surface 2 is provided at the joint surface defined between a first lens L1, which is a plano-convex lens, and a second lens L2, which is a meniscus lens having a concave surface directed toward the pupil position 1, and the second semitransparent reflecting surface 3 is provided at the joint surface defined between the second lens L2 and a third lens L3, which is a plano-concave lens. The three lenses L1 to L3 have the same refractive index. In this example, the angle of view is 70°, the focal length F is 10 mm, and F-number is 2.5.

FIGS. 23(a)(1) to 23(a)(3) and 23(b)(1) to 23(b)(10) graphically show various aberrations in this example in the same way as in FIGS. 15(a)(1) to 15(a)(3) and 15(b)(1) to 15(b)(6).

Figure 14:
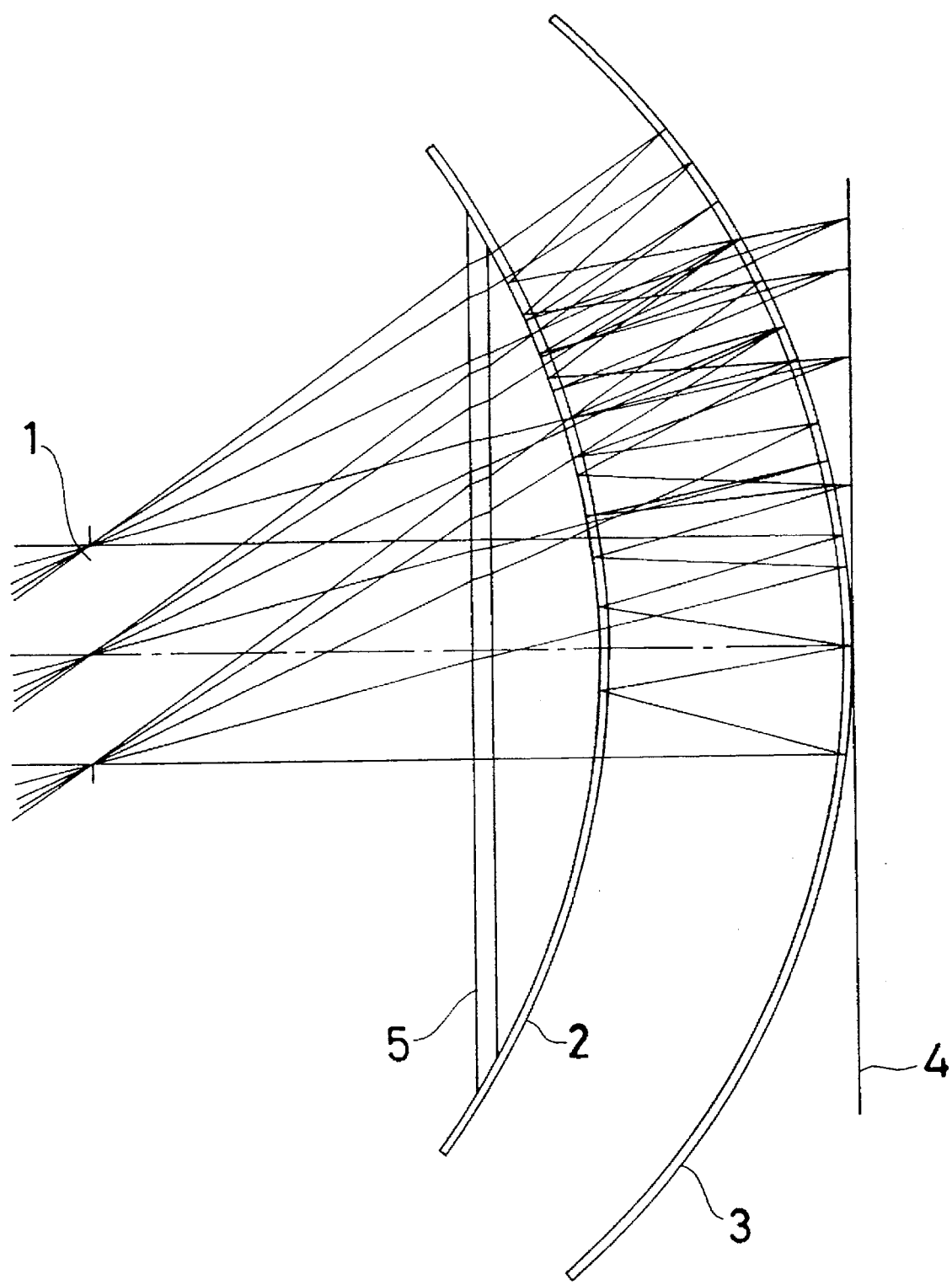
FIG. 14 is a sectional view of a tenth example of the present invention.
Figure 24:
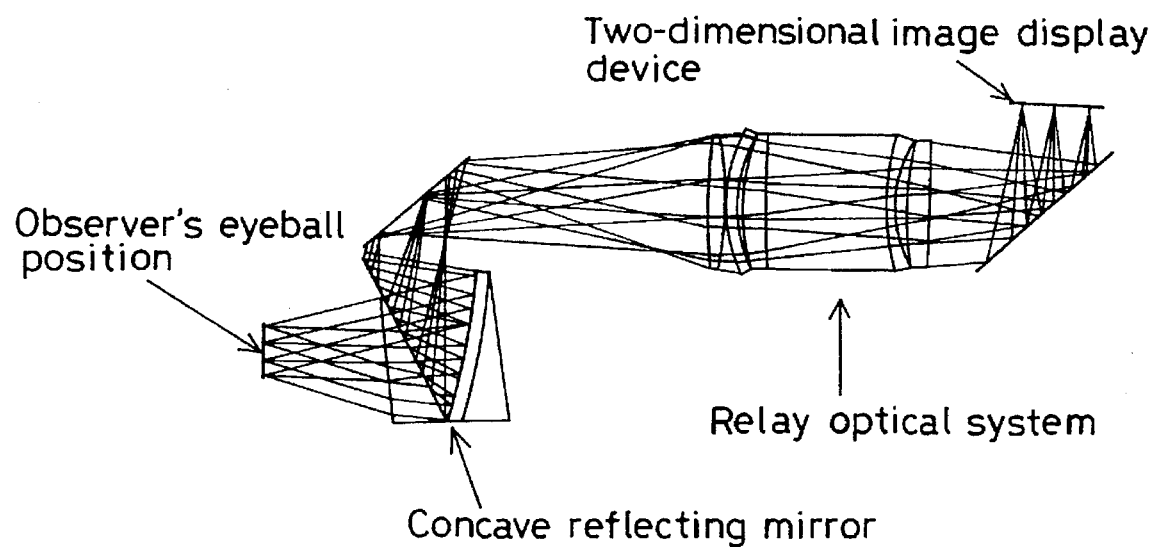
FIG. 24 is a sectional view showing the optical system of a conventional head-mounted visual display apparatus.
Figure 25:
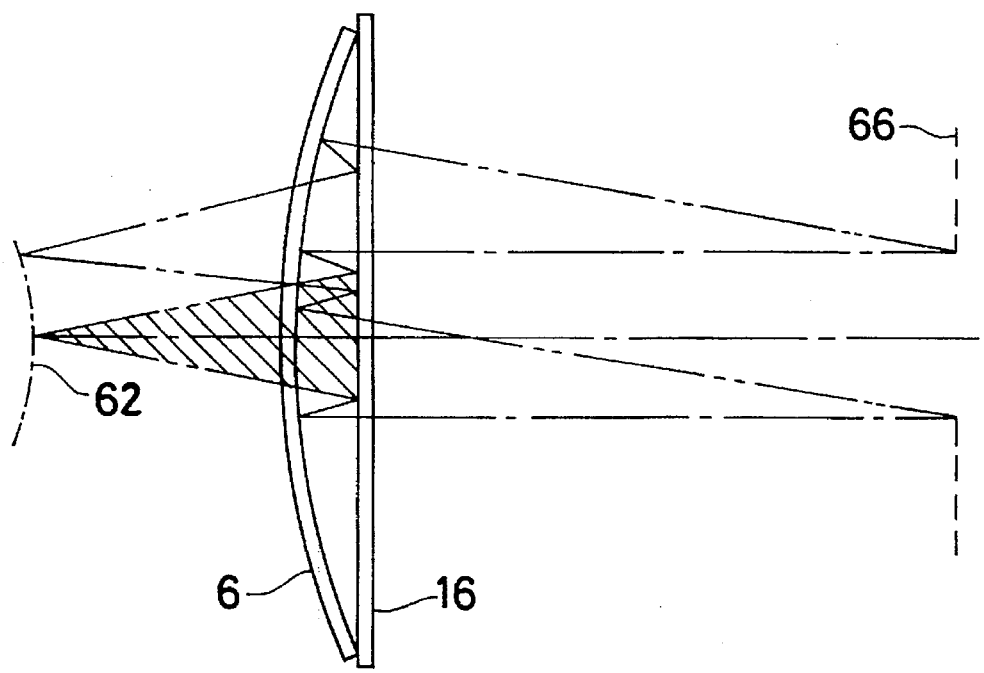
FIG. 25 is a sectional view of a conventional reflective ocular optical system.

Tenth Example:

A tenth example of the present invention will be explained with reference to FIG. 14. Numerical data in this example will be shown later. In the figure, reference numeral 1 denotes a pupil position, 2 a first semitransparent reflecting surface, 3 a second semitransparent reflecting surface, 4 an image surface, and a protective glass. Examples of numerical values are shown below. In this example, the angle of view is 70°, the focal length F is 10 mm, and the F-number is 3.0.

Numerical data in the above-described first to tenth examples will be shown below.

EXAMPLE 1

| Surface No. | Curvature radius | Surface separation | n d | v d |
|---|---|---|---|---|
| 1 | pupil position 1 | 9.158 | | |
| 2 | −5.5382 | 1.624 | 1.5163 | 64.1 |
| 3 | −7.7395 | 0.071 | | |
| 4 | −7.8437 | 2.777 | 1.5163 | 64.1 |
| 5 | −9.1995 (reflecting surface 3) | −2.777 | 1.5163 | 64.1 |
| 6 | −7.8437 | −0.071 | | |
| 7 | −7.7395 (reflecting surface 2) | 0.071 | | |
| 8 | −7.8437 | 2.777 | 1.5163 | 64.1 |
| 9 | −9.1995 | 5.141 | | |
| 10 | image surface 4 | | | |

EXAMPLE 2

| Surface No. | Curvature radius | Surface separation | n d | v d |
|---|---|---|---|---|
| 1 | pupil position 1 | 10.130 | | |
| 2 | −13.6165 | 5.239 | 1.5163 | 64.1 |
| 3 | −14.6357 (reflecting surface 3) | −5.239 | 1.5163 | 64.1 |
| 4 | −13.6165 (reflecting surface 2) | 5.239 | 1.5163 | 64.1 |
| 5 | −14.6357 | 1.216 | | |
| 6 | image surface 4 | | | |

EXAMPLE 3

| Surface No. | Curvature radius | Surface separation | n d | v d |
|---|---|---|---|---|
| 1 | pupil position 1 | 11.423 | | |
| 2 | −14.4225 | 4.817 | 1.5163 | 64.1 |
| 3 | −14.9832 (reflecting surface 3) | −4.817 | 1.5163 | 64.1 |
| 4 | −14.4225 (reflecting surface 2) | 4.817 | 1.5163 | 64.1 |
| 5 | −14.9832 | 0.046 | | |
| 6 | 12.5539 (aspheric) K = 0 B = −0.213608 × 10$^{-5}$ | 0.914 A = −0.352385 × 10$^{-3}$ C = 0 | 1.5163 | 64.1 |
| 7 | 110.7802 | 1.857 | | |
| 8 | image surface 4 | | | |

EXAMPLE 4

| Surface No. | Curvature radius | Surface separation | n d | v d |
|---|---|---|---|---|
| 1 | pupil position 1 | 13.127 | | |
| 2 | −11.2445 | 5.633 | 1.5163 | 64.1 |
| 3 | −14.0354 (reflecting surface 3) | −5.633 | 1.5163 | 64.1 |
| 4 | −11.2445 (reflecting surface 2) | 5.633 | 1.5163 | 64.1 |
| 5 | −14.0354 | 0.348 | | |
| 6 | image surface 4 | | | |

EXAMPLE 5

| Surface No. | Curvature radius | Surface separation | n d | v d |
|---|---|---|---|---|
| 1 | pupil position 1 | 5.805 | | |
| 2 | −24.3790 | 4.437 | 1.5163 | 64.1 |
| 3 | −17.4632 (reflecting surface 3) | −4.437 | 1.5163 | 64.1 |
| 4 | −24.3790 (reflecting surface 2) | 4.437 | 1.5163 | 64.1 |
| 5 | −17.4632 | 3.193 | | |
| 6 | image surface 4 | | | |

EXAMPLE 6

| Surface No. | Curvature radius | Surface separation | n d | v d |
|---|---|---|---|---|
| 1 | pupil position 1 | 7.259 | | |
| 2 | −27.0911 | 4.287 | 1.5163 | 64.1 |
| 3 | −18.0607 (reflecting surface 3) | −4.287 | 1.5163 | 64.1 |
| 4 | −27.0911 (reflecting surface 2) | 4.287 | 1.5163 | 64.1 |
| 5 | −18.0607 | 3.534 | | |
| 6 | image surface 4 | | | |

EXAMPLE 7

| Surface No. | Curvature radius | Surface separation | n d | v d |
|---|---|---|---|---|
| 1 | pupil position 1 | 9.152 | | |
| 2 | −10.2521 | 5.711 | 1.5163 | 64.1 |
| 3 | −13.6695 (reflecting surface 3) | −5.711 | 1.5163 | 64.1 |
| 4 | −10.2521 (reflecting surface 2) | 5.711 | 1.5163 | 64.1 |
| 5 | −13.6695 | 0.100 | | |
| 6 | image surface 4 | | | |

EXAMPLE 8

| Surface No. | Curvature radius | Surface separation | n d | v d |
|---|---|---|---|---|
| 1 | pupil position 1 | 8.255 | | |
| 2 | ∞ | 2.813 | 1.5163 | 64.1 |
| 3 | −22.1680 | 0.355 | | |
| 4 | −19.6995 | 5.058 | 1.5163 | 64.1 |
| 5 | −18.7996 (reflecting surface 3) | −5.058 | 1.5163 | 64.1 |
| 6 | −19.6995 | −0.355 | | |
| 7 | −22.1680 (reflecting surface 2) | 0.355 | | |
| 8 | −19.6995 | 5.058 | 1.5163 | 64.1 |
| 9 | −18.7996 | 0.520 | | |
| 10 | image surface 4 | | | |

EXAMPLE 9

| Surface No. | Curvature radius | Surface separation | n d | v d |
|---|---|---|---|---|
| 1 | pupil position 1 | 8.255 | | |
| 2 | ∞ | 5.426 | 1.5163 | 64.1 |
| 3 | −12.7792 | 2.822 | 1.5163 | 64.1 |
| 4 | −12.9610 (reflecting surface 3) | −2.822 | 1.5163 | 64.1 |
| 5 | −12.7792 (reflecting surface 2) | 3.322 | 1.5163 | 64.1 |
| 6 | ∞ | 3.455 | | |
| 7 | image surface 4 | | | |

EXAMPLE 10

| Surface No. | Curvature radius | Surface separation | n d | v d |
|---|---|---|---|---|
| 1 | pupil position 1 | 5.975 | | |
| 2 | ∞ | 0.337 | 1.5163 | 64.1 |
| 3 | ∞ | 1.660 | | |
| 4 | −12.2885 | 0.168 | 1.5163 | 64.1 |
| 5 | −12.2885 | 3.583 | | |
| 6 | −12.5161 | 0.168 | 1.5163 | 64.1 |
| 7 | −12.5161 (reflecting surface 3) | −0.168 | 1.5163 | |
| 8 | −12.5161 | −3.583 | | |
| 9 | −12.2885 | −0.168 | 1.5163 | 64.1 |
| 10 | −12.2885 (reflecting surface 2) | 0.168 | 1.5163 | 64.1 |
| 11 | −12.2885 | 3.583 | | |
| 12 | −12.5161 | 0.168 | 1.5163 | 64.1 |
| 13 | −12.5161 | 0.033 | | |
| 14 | image surface 4 | | | |

The table below shows values in the foregoing examples for the above-described conditions (2) (=(6)), (3), (4), (5), (7) (=(8)), and (9).

| Conditions | (2) | (3) | (4) | (5) | (7) | (9) |
|---|---|---|---|---|---|---|
| Example 1 | 0.84 | 1.48 | 1.14 | 1.40 | 1.09 | 0.28 |
| Example 2 | 0.93 | 1.05 | 1.29 | 0.74 | 1.01 | 0.52 |
| Example 3 | 0.99 | 1.27 | 1.28 | 0.99 | 0.92 | 0.27 |
| Example 4 | 0.80 | 1.34 | 1.20 | 1.17 | 1.31 | 0.56 |
| Example 5 | 1.40 | 0.55 | 1.65 | 0.21 | 0.51 | 0.44 |
| Example 6 | 1.50 | 0.64 | 1.74 | 0.27 | 0.73 | 0.43 |
| Example 7 | 0.75 | 1.09 | 1.17 | 0.89 | 0.92 | 0.57 |
| Example 8 | 1.18 | 0.88 | 1.45 | 0.51 | 1.14 | 0.51 |
| Example 9 | 0.99 | 1.27 | 1.20 | 1.07 | 1.37 | 0.28 |
| Example 10 | 0.98 | 0.95 | 1.29 | 0.65 | 0.80 | 0.39 |

As will be clear from the foregoing description, it is possible according to the present invention to provide a compact and lightweight head-mounted visual display apparatus which enables observation of an image that is clear as far as the edges of the visual field at a wide viewing angle using a planar two-dimensional image display device.

In addition, the present invention makes it possible to provide a visual display apparatus which enables observation of the an image that is clear as far as the edges of visual field at a wide presentation viewing angle.

What we claim is:

1. A visual display apparatus comprising:
    first image display means for displaying a first image; and
    a first ocular optical system for projecting said first image formed by said first image display means and for leading said first image to a first eye of an observer, said first ocular optical system comprising at least one lens including:
        a first semitransparent reflecting surface which has a first center of curvature substantially on an optical axis of said at least one lens,
        a concave surface directed toward said center of curvature,
        a second semitransparent reflecting surface which has a second center of curvature at approximately a same position with respect to said optical axis as said first center of curvature, and
        a single concentric optical system disposed between said first semitransparent reflecting surface and said second semitransparent reflecting surface, said single concentric optical system being formed of a medium having an index of refraction greater than 1.

2. A visual display apparatus according to claim 1, wherein:

a refractive power of said ocular optical system for light rays passing therethrough without being reflected by either of said first semitransparent reflecting surface and said second semitransparent reflecting surface is substantially zero.

3. A visual display apparatus according to claim 1, further comprising:

means for positioning both said first image display means and said first ocular optical system with respect to a head of said observer.

4. A visual display apparatus according to claim 1, further comprising:

means for supporting both said first image display means and said first ocular optical system with respect to a head of said observer so that said visual display apparatus can be fitted to said head of said observer.

5. A visual display apparatus according to claim 1, further comprising:

second image display means for displaying a second image;

a second ocular optical system for projecting said second image formed by said second image display means and for leading said second image to a second eye of said observer, said second ocular optical system comprising at least one lens including:

a first semitransparent reflecting surface which has a first center of curvature substantially on an optical axis of said at least one lens, a concave surface directed toward said center of curvature, a second semitransparent reflecting surface which has a second center of curvature at approximately a same position with respect to said optical axis as said first center of curvature, and a single concentric optical system disposed between said first semitransparent reflecting surface and said second semitransparent reflecting surface, said single concentric optical system being formed of a medium having an index of refraction greater than 1; and means for supporting said first ocular optical system and said second ocular optical system with a predetermined spacing therebetween.

6. A visual display apparatus according to 1, which satisfies the following condition:

$$1 < (|R_1| + D_2)/|R_2| < 1.8$$

where $R_1$ is a radius of curvature of said first semitransparent reflecting surface, said first semitransparent reflecting surface being closer to a pupil of said observer than said second semitransparent reflecting surface, $R_2$ is a radius of curvature of said second semitransparent reflecting surface, and $D_2$ is a surface separation between said first semitransparent reflecting surface and said second semitransparent reflecting surface.

7. A visual display apparatus according to claim 1, which satisfies the following condition:

$$|D_1/R_1| < 1.5$$

where $R_1$ is a radius of curvature of said first semitransparent reflecting surface, said first semitransparent reflecting sur-face being closer to a pupil of said observer than said second semitransparent reflecting surface, and $D_1$ is a distance from said pupil to said first semitransparent reflecting surface.

8. A visual display apparatus comprising:

first display means for displaying a first image for an observer's right eye;

second display means for displaying a second image for an observer's left eye;

a first ocular optical system for projecting said first image to said observer's right eye, said first ocular optical system comprising:

a first concentric optical system including a first semitransparent reflecting surface and a second semitransparent reflecting surface, and a medium disposed between said first semitransparent reflecting surface and said second semitransparent reflecting surface of said first concentric optical system, said medium having an index of refraction greater than 1, said first semitransparent reflecting surface and said second semitransparent reflecting surface of said first concentric optical system having respective centers of curvature at approximately a same position with respect to an optical axis of said first concentric optical system; and a second ocular optical system for protecting said second image to said observer's left eye, said second ocular optical system comprising:

a second concentric optical system including a first semitransparent reflecting surface and a second semitransparent reflecting surface, a medium disposed between said first semitransparent reflecting surface and said second semitransparent reflecting surface of said second concentric optical system, said medium having an index of refraction greater than 1, said first semitransparent reflecting surface and said second semitransparent reflecting surface of said second concentric optical system having respective centers of curvature at approximately a same position with respect to an optical axis of said second concentric optical system, and said second concentric optical system being juxtaposed with said first concentric optical system and spaced away from said first concentric optical system by a distance substantially equal to an interpupillary distance between said observer's right and left eyes.

9. A visual display apparatus according to claim 1 or 8, wherein:

each of said first semitransparent reflecting surfaces and said second semitransparent reflecting surfaces are arranged such that a bundle of rays passing through said first semitransparent reflecting surface are reflected by said second semitransparent reflecting surface associated therewith, and said bundle of rays reflected by said second semitransparent reflecting surface associated therewith are reflected by said first semitransparent reflecting surface and then pass through said second semitransparent reflecting surface associated therewith.

10. A visual display apparatus according to claim 9, wherein:

each of said first semitransparent reflecting surface and said second semitransparent reflecting surface associated therewith are disposed with a respective concave surface directed toward said observer.

11. A visual display apparatus according to claim 9, wherein:

said respective centers of curvature of each of said first semitransparent reflecting surface and said second semitransparent reflecting surface associated therewith are disposed in a vicinity of a pupil of an eye of said observer;

each of said first semitransparent reflecting surface and said second semitransparent reflecting surface include a respective concave surface directed towards said pupil; and said first semitransparent reflecting surface and said second semitransparent reflecting surface being disposed so that each of said first semitransparent reflecting surface and said second semitransparent reflecting surface transmits light rays at least once and reflects light rays at least once.

12. A visual display apparatus according to claim 1 or 8, further comprising:

cut-off means, including a polarizing optical element, for cutting off light rays passing through said first ocular optical system without being reflected by either of said first semitransparent reflecting surface and said second semitransparent reflecting surface.

13. A visual display apparatus according to claim 1 or 8, which satisfies the following condition:

$$0.5 < |R_1/R_2| < 1.8$$

where $R_1$ and $R_2$ are radii of curvature of each of said first semitransparent reflecting surface and said second semitransparent reflecting surface, respectively.

14. A visual display apparatus according to claim 1 or 8, which satisfies the following condition:

$$0.4 < |(D_1+D_2)/R_2| < 1.7$$

where $R_2$ is a radius of curvature of said second semitransparent reflecting surface, $D_1$ is a distance from a pupil of said observer to said first semitransparent reflecting surface, said first semitransparent reflecting surface being closer to said pupil than said second semitransparent reflecting surface, and $D_2$ is a surface separation between said first semitransparent reflecting surface and said second semitransparent reflecting surface.

15. A visual display apparatus according to claim 1 or 8, wherein:

said first semitransparent reflecting surface and said second semitransparent reflecting surface face each other across said medium.

16. A visual display apparatus according to claim 1 or 8, wherein:

said first ocular optical system comprises one lens;

said second semitransparent reflecting surface is disposed on a first surface of said one lens which is closest to said first image display means; and said first semitransparent reflecting surface is disposed on a second surface of said one lens which is closest to said eye of said observer.

17. A visual display apparatus comprising:

image display means for displaying an image; and an ocular optical system for projecting said image formed by said image display means and for leading said image to an eye of an observer, said ocular optical system including:

a first lens having a convex surface on a surface thereof which is closest to said image display means, a second lens of meniscus form which has a convex surface directed toward said image display means, a third lens having a concave surface on a surface thereof which is closest to said eye of said observer, a first semitransparent reflecting surface provided between said first lens and said second lens, and a second semitransparent reflecting surface provided between said second lens and said third lens.

18. A visual display apparatus according to claim 17, wherein:

said first semitransparent reflecting surface is provided on said first lens; and said second semitransparent reflecting surface is provided on said second lens.

19. A visual display apparatus according to claim 17, wherein:

said first semitransparent reflecting surface is provided on said first lens; and said second semitransparent reflecting surface is provided on said third lens.

20. A visual display apparatus according to claim 17, wherein:

said first semitransparent reflecting surface is provided on said second lens; and said second semitransparent reflecting surface is also provided on said second lens.

21. A visual display apparatus according to claim 17, wherein:

said first semitransparent reflecting surface is provided on said second lens; and said second semitransparent reflecting surface is provided on said third lens.

22. A visual display apparatus according to claim 17, 18, 19, 20, or 21, wherein:

said first lens, said second lens, and said third lens constitute a cemented lens.

23. A visual display apparatus comprising:

image display means for displaying an image; and an ocular optical system for projecting said image formed by said image display means and for leading said image to an eye of an observer, said ocular optical system including:

a first lens having a convex surface on a surface thereof which is closest to said image display means, and a second lens of meniscus form which has a convex surface directed toward said image display means, a first semitransparent reflecting surface provided between said first lens and said second lens, and a second semitransparent reflecting surface provided on a surface of said second lens which is closest to said image display means.

24. A visual display apparatus according to claim 23, wherein:

said first semitransparent reflecting surface is provided on said first lens.

25. A visual display apparatus according to claim 23, wherein:

said first semitransparent reflecting surface is provided on said second lens.

26. A visual display apparatus according to claim 23, 24, or 25, wherein:

said first lens and said second lens face each other across an air spacing.

27. A visual display apparatus according to claim 1, wherein said ocular optical system further comprises:

a concentric optical system comprising:
- a semitransparent reflecting surface having a first center of curvature,
- a transparent surface having a second center of curvature at approximately said same position with respect to said optical axis as said semitransparent reflecting surface, and
- a medium between said semitransparent reflecting surface and said transparent surface, said medium having an index of refraction greater than 1.

28. A head-mounted visual display apparatus comprising:

a display for forming a two-dimensional image; and an optical system for directing said two-dimensional image toward an eye of an observer, said optical system consisting of:
- a meniscus lens having a convex surface directed toward said display, said meniscus lens including:
  - a first semitransparent reflecting surface on a first surface of said meniscus lens, and
  - a second semitransparent reflecting surface on a second surface of said meniscus lens;
  - said meniscus lens being formed of a medium having an index of refraction greater than 1.

29. A visual display apparatus comprising:

a display for displaying a 2-D image; and a first lens having a concave surface facing away from said display, said first lens having an overall negative power;

a first semitransparent reflecting surface provided on said concave surface of said first lens;

a second lens of meniscus shape having a convex surface facing said first semitransparent reflecting surface;

a second semitransparent reflecting surface provided on a concave surface of said second lens; and a third lens having a convex surface facing said second semitransparent reflecting surface.

30. A visual display apparatus according to claim 29, wherein:

said first lens, said second lens, and said third lens form a single cemented lens unit.

* * * * *